United States Patent
Jung et al.

(10) Patent No.: US 7,604,206 B2
(45) Date of Patent: *Oct. 20, 2009

(54) MONITOR IMPROVED IN A TILTING AND COMBINING STRUCTURE

(75) Inventors: Hyun-jun Jung, Suwon (KR); Jun-soo Jeong, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/295,831

(22) Filed: Nov. 18, 2002

(65) Prior Publication Data

US 2004/0211866 A1    Oct. 28, 2004

(30) Foreign Application Priority Data

| Nov. 19, 2001 | (KR) | ............................... | 2001-71860 |
| May 20, 2002 | (KR) | ............................... | 2002-27683 |
| Sep. 17, 2002 | (KR) | ............................... | 2002-56429 |

(51) Int. Cl.
    *A47F 5/12*    (2006.01)

(52) U.S. Cl. .................... 248/133; 248/923; 16/340

(58) Field of Classification Search ................ 248/919, 248/923, 920, 922, 917, 419, 421, 371, 133, 248/122.1, 292.12, 292.13; 361/681, 682, 361/683; 16/340, 342, 371, 374
See application file for complete search history.

(56) References Cited

U.S. PATENT DOCUMENTS

| 2,041,370 A | 5/1936 | Pottorff |
| 2,042,443 A | 5/1936 | Buckstone |
| 2,628,142 A | 2/1953 | Dubach |
| 2,890,010 A | 6/1959 | Barkheimer |
| 3,285,207 A | 11/1966 | Heinz-Günther |
| 3,434,684 A | 3/1969 | Warden |
| 3,788,587 A | 1/1974 | Stemmler |
| 4,113,215 A | 9/1978 | Stapleton .................... 248/183 |
| 4,166,522 A | 9/1979 | Bourcier de Carbon |

(Continued)

FOREIGN PATENT DOCUMENTS

CN    1031010 C    2/1996

(Continued)

OTHER PUBLICATIONS

Korean Office Action dated Jul. 26, 2004.

(Continued)

*Primary Examiner*—A. Joseph Wujciak
(74) *Attorney, Agent, or Firm*—Staas & Halsey LLP

(57) ABSTRACT

A monitor has a monitor main body and a base member to support the monitor main body. The monitor includes a link member disposed between the monitor main body and the base member, a base hinge coupling the link member, which is to be rotated within a predetermined angle against the base member, with the base member, and a monitor hinge coupling the monitor main body, which is to be rotated against the link member, with the link member. The monitor includes an auxiliary link member to link the rotation of the link member against the base member with the rotation of monitor main body, and a base bracket combined to the base member to allow the base member to be installed on an inclined plane.

48 Claims, 37 Drawing Sheets

U.S. PATENT DOCUMENTS

| | | | |
|---|---|---|---|
| 4,235,405 A | 11/1980 | Carey | |
| 4,329,800 A | 5/1982 | Shuman | |
| 4,339,104 A | 7/1982 | Weidman | |
| 4,395,010 A | 7/1983 | Helgeland et al. | |
| 4,438,458 A | 3/1984 | Münscher | 358/254 |
| 4,447,031 A | 5/1984 | Souder, Jr. et al. | 248/280.1 |
| 4,616,218 A | 10/1986 | Bailey et al. | |
| 4,669,694 A | 6/1987 | Malick | 248/397 |
| 4,690,362 A | 9/1987 | Helgeland | |
| 4,691,886 A * | 9/1987 | Wendling et al. | 248/183.1 |
| 4,729,533 A * | 3/1988 | Hillary et al. | 248/184.1 |
| D295,415 S | 4/1988 | Thies et al. | D14/100 |
| 4,768,744 A | 9/1988 | Leeds et al. | 248/280.1 |
| 4,777,750 A | 10/1988 | Garfinkle | |
| 4,834,329 A * | 5/1989 | Delapp | 248/183.3 |
| 4,846,434 A | 7/1989 | Krogsrud | 248/280.1 |
| 4,859,092 A | 8/1989 | Makita | 400/83 |
| 4,864,601 A | 9/1989 | Berry | 379/96 |
| 4,924,931 A | 5/1990 | Miller | |
| D313,405 S | 1/1991 | Barry et al. | D14/100 |
| 4,989,813 A * | 2/1991 | Kim et al. | 248/184.1 |
| 5,012,852 A | 5/1991 | Blackhurst | |
| 5,088,676 A | 2/1992 | Orchard et al. | |
| 5,102,084 A | 4/1992 | Park | |
| 5,107,402 A | 4/1992 | Malgouires | 361/393 |
| 5,112,019 A | 5/1992 | Melzler et al. | |
| 5,144,290 A | 9/1992 | Honda et al. | 340/711 |
| 5,163,652 A | 11/1992 | King | |
| 5,206,790 A | 4/1993 | Thomas et al. | 361/380 |
| D337,104 S | 7/1993 | Orchard | D14/100 |
| D349,489 S | 8/1994 | Wang | 248/917 |
| 5,335,142 A | 8/1994 | Anderson | |
| 5,383,138 A | 1/1995 | Motoyama et al. | 364/708.1 |
| 5,422,951 A | 6/1995 | Takahashi et al. | |
| 5,437,236 A | 8/1995 | Zeiner | |
| 5,549,264 A | 8/1996 | West | |
| 5,634,537 A | 6/1997 | Thorn | |
| 5,713,549 A | 2/1998 | Shieh | |
| 5,751,548 A | 5/1998 | Hall et al. | |
| 5,758,849 A | 6/1998 | Bui et al. | |
| 5,771,152 A | 6/1998 | Crompton et al. | |
| 5,799,917 A | 9/1998 | Li | |
| 5,812,368 A | 9/1998 | Chen et al. | 361/681 |
| 5,835,342 A | 11/1998 | Hunte | 361/681 |
| 5,876,008 A | 3/1999 | Sweere et al. | |
| 5,894,633 A | 4/1999 | Kaneko | |
| 5,911,523 A | 6/1999 | Burchart | |
| 5,924,665 A | 7/1999 | Sweere et al. | |
| 5,941,493 A | 8/1999 | Cheng | |
| 5,947,429 A | 9/1999 | Sweere et al. | |
| 5,975,472 A | 11/1999 | Hung | |
| 5,992,809 A * | 11/1999 | Sweere et al. | 248/278.1 |
| 5,997,493 A | 12/1999 | Young | |
| 6,012,693 A | 1/2000 | Voeller et al. | 248/280.11 |
| 6,015,120 A * | 1/2000 | Sweere et al. | 248/123.11 |
| 6,018,847 A | 2/2000 | Lu | 16/337 |
| 6,031,714 A | 2/2000 | Ma | 361/681 |
| 6,056,248 A | 5/2000 | Ma | |
| 6,062,148 A | 5/2000 | Hodge et al. | |
| 6,064,373 A | 5/2000 | Ditzik | 345/173 |
| 6,081,420 A * | 6/2000 | Kim et al. | 361/681 |
| 6,113,046 A * | 9/2000 | Wang | 248/278.1 |
| 6,116,690 A | 9/2000 | Larson | |
| 6,125,507 A | 10/2000 | Katoh | |
| 6,134,103 A * | 10/2000 | Ghanma | 361/681 |
| 6,145,797 A | 11/2000 | Uehara | |
| 6,164,611 A | 12/2000 | Kuhnke | |
| 6,168,124 B1 | 1/2001 | Matsuoka et al. | 248/176.1 |
| 6,189,842 B1 | 2/2001 | Bergeron Gull et al. | |
| 6,189,849 B1 | 2/2001 | Sweere et al. | |
| 6,189,850 B1 | 2/2001 | Liao et al. | |
| 6,231,021 B1 | 5/2001 | Hong | |
| 6,233,138 B1 | 5/2001 | Osgood | |
| 6,270,047 B1 | 8/2001 | Hudson | |
| 6,276,655 B1 | 8/2001 | Byoun | |
| 6,286,794 B1 | 9/2001 | Harbin | |
| 6,288,891 B1 * | 9/2001 | Hasegawa et al. | 361/681 |
| 6,305,659 B1 | 10/2001 | Metelski | |
| 6,326,955 B1 | 12/2001 | Ditzik | 345/173 |
| 6,347,433 B1 | 2/2002 | Novin et al. | |
| 6,352,226 B1 | 3/2002 | Gordon | |
| 6,367,756 B1 | 4/2002 | Wang | |
| 6,378,830 B1 | 4/2002 | Lu | |
| 6,381,125 B1 | 4/2002 | Mizoguchi et al. | |
| 6,390,433 B1 | 5/2002 | Kasa-Djukic | |
| 6,394,403 B1 | 5/2002 | Hung | |
| 6,397,761 B1 | 6/2002 | Moore | |
| 6,402,109 B1 | 6/2002 | Dittmer | |
| 6,409,134 B1 * | 6/2002 | Oddsen, Jr. | 248/274.1 |
| 6,419,196 B1 | 7/2002 | Sweere et al. | |
| 6,430,038 B1 | 8/2002 | Helot et al. | |
| 6,478,275 B1 | 11/2002 | Huang | |
| 6,494,150 B1 | 12/2002 | Phoenix et al. | |
| 6,499,704 B2 | 12/2002 | Oddsen, Jr. | |
| 6,502,792 B1 | 1/2003 | Cho et al. | |
| 6,517,040 B1 | 2/2003 | Wen | |
| 6,522,530 B2 * | 2/2003 | Bang | 361/681 |
| 6,532,628 B2 | 3/2003 | Kim | |
| 6,585,201 B1 | 7/2003 | Reed | |
| 6,592,090 B1 | 7/2003 | Li | |
| 6,601,810 B2 | 8/2003 | Lee | |
| 6,609,272 B1 | 8/2003 | Lee | |
| 6,609,686 B2 | 8/2003 | Malizia | |
| 6,672,553 B1 | 1/2004 | Lin | |
| 6,680,843 B2 | 1/2004 | Farrow et al. | |
| 6,695,266 B1 | 2/2004 | Tsai | |
| 6,695,274 B1 | 2/2004 | Chiu | |
| 6,698,063 B2 | 3/2004 | Kim et al. | |
| 6,702,238 B1 | 3/2004 | Wang | |
| 6,708,940 B2 | 3/2004 | Ligertwood | |
| 6,712,321 B1 | 3/2004 | Su et al. | |
| D489,370 S | 5/2004 | Jobs et al. | |
| 6,766,994 B2 | 7/2004 | Serbinski et al. | |
| 6,769,657 B1 | 8/2004 | Huang | |
| 6,796,541 B2 | 9/2004 | Lu | |
| 6,819,550 B2 | 11/2004 | Jobs et al. | |
| 6,822,857 B2 | 11/2004 | Jung et al. | 361/681 |
| 6,837,469 B2 | 1/2005 | Wu et al. | 248/278.1 |
| 6,857,610 B1 | 2/2005 | Conner et al. | |
| 6,874,743 B2 | 4/2005 | Watanabe et al. | |
| 6,889,958 B2 | 5/2005 | Hoffend, Jr. | |
| 6,905,099 B2 | 6/2005 | Sung et al. | |
| 6,954,221 B2 | 10/2005 | Wu | |
| 7,055,218 B2 | 6/2006 | Lu et al. | |
| 7,168,665 B2 | 1/2007 | Hong et al. | |
| 7,177,144 B2 | 2/2007 | Ha et al. | |
| 7,195,214 B2 | 3/2007 | Lee et al. | |
| 7,237,755 B2 | 7/2007 | Cho et al. | |
| 7,274,555 B2 | 9/2007 | Kim et al. | |
| 2001/0017761 A1 | 8/2001 | Ditzik | 361/681 |
| 2002/0011544 A1 | 1/2002 | Bosson | |
| 2002/0020792 A1 | 2/2002 | Lee | |
| 2002/0130981 A1 | 9/2002 | Ma et al. | 348/843 |
| 2003/0075649 A1 | 4/2003 | Jeong et al. | 248/157 |
| 2003/0075653 A1 | 4/2003 | Li | |
| 2003/0080949 A1 | 5/2003 | Ditzik | 345/173 |
| 2003/0086240 A1 | 5/2003 | Jobs et al. | 361/683 |
| 2003/0132360 A1 | 7/2003 | Ju | 248/371 |
| 2003/0142474 A1 | 7/2003 | Karidis et al. | |
| 2004/0011932 A1 | 1/2004 | Duff | |
| 2004/0056161 A1 | 3/2004 | Ishizaki et al. | |
| 2004/0057197 A1 | 3/2004 | Hill et al. | |
| 2004/0084585 A1 | 5/2004 | Watanabe et al. | |
| 2004/0084588 A1 | 5/2004 | Liu et al. | |

| | | |
|---|---|---|
| 2004/0118984 A1 | 6/2004 | Kim et al. |

FOREIGN PATENT DOCUMENTS

| | | | |
|---|---|---|---|
| CN | 2504675 | 8/2002 | |
| DE | 2847135 | 5/1980 | |
| DE | 39 43 137 A1 | 8/1991 | |
| DE | 200 09 691 | 11/2000 | |
| DE | D. 4214341 A1 | 7/2003 | |
| EP | 0 046 225 | 2/1982 | |
| EP | 244 566 | 11/1987 | |
| EP | 631 174 B1 | 4/1998 | |
| EP | 1085753 | 3/2001 | |
| GB | 2 206 464 | 1/1989 | |
| JP | 57-151990 | 9/1982 | |
| JP | 61-99873 | 5/1986 | |
| JP | 61-99874 | 5/1986 | |
| JP | 61-196314 | 8/1986 | |
| JP | 62-96681 | 5/1987 | |
| JP | 62-96682 | 6/1987 | |
| JP | 62-239677 | 10/1987 | |
| JP | 1-273086 | 10/1989 | |
| JP | 2-58783 | 4/1990 | |
| JP | 2-215408 | 8/1990 | |
| JP | 03-2381 | 1/1991 | |
| JP | 3-29800 | 3/1991 | |
| JP | 3-095586 | 4/1991 | |
| JP | 3-113423 | 11/1991 | |
| JP | 3-114875 | 11/1991 | |
| JP | 4-15680 | 1/1992 | |
| JP | 04-15680 | 1/1992 | |
| JP | 4-33073 | 3/1992 | |
| JP | 4-81182 | 3/1992 | |
| JP | 4-107284 | 4/1992 | |
| JP | 4-155375 | 5/1992 | |
| JP | 04-155375 | 5/1992 | |
| JP | 4-198979 | 7/1992 | |
| JP | 3-017022 | 9/1992 | |
| JP | 4-132517 | 12/1992 | |
| JP | 05-36523 | 2/1993 | |
| JP | 5-36523 | 2/1993 | |
| JP | 5-23576 | 3/1993 | |
| JP | 1993-23576 | 3/1993 | |
| JP | 5-097098 | 4/1993 | |
| JP | 5-36423 | 5/1993 | |
| JP | 5-36523 | 5/1993 | |
| JP | 5-188865 | 7/1993 | |
| JP | 05-66715 | 9/1993 | |
| JP | 64778 | 1/1994 | |
| JP | 06-37912 | 2/1994 | |
| JP | 6-37912 | 2/1994 | |
| JP | 6-21079 | 3/1994 | |
| JP | 6-118880 | 4/1994 | |
| JP | 06-37912 | 5/1994 | |
| JP | 8-121009 | 5/1996 | |
| JP | 8-234672 | 9/1996 | |
| JP | 8-319753 | 12/1996 | |
| JP | 10-126068 | 5/1998 | |
| JP | 10-214034 | 8/1998 | 1/16 |
| JP | 10-228333 | 8/1998 | |
| JP | 11-006520 | 1/1999 | |
| JP | 11-95866 | 4/1999 | 1/16 |
| JP | 11-095866 | 4/1999 | |
| JP | 11-154460 | 6/1999 | |
| JP | 11-214859 | 8/1999 | |
| JP | 11-338576 | 12/1999 | |
| JP | 2000-019981 | 1/2000 | |
| JP | 2000-56695 | 2/2000 | |
| JP | 3068198 | 2/2000 | |
| JP | 2000-122561 | 4/2000 | |
| JP | 2000-206893 | 7/2000 | |
| JP | 2000-206901 | 7/2000 | |
| JP | 2000-242363 | 9/2000 | 1/16 |
| JP | 3073553 | 9/2000 | |
| JP | 2000267581 | 9/2000 | |
| JP | 2001-50244 | 2/2001 | |
| JP | 2001-075486 | 3/2001 | |
| JP | 2001-142407 | 5/2001 | |
| JP | 2001-202026 | 7/2001 | |
| JP | 2001-241427 | 9/2001 | |
| JP | 20026990 | 1/2002 | |
| KR | 2000-73608 | 12/0000 | |
| KR | 1989-3755 | 6/1989 | |
| KR | 88-3444 | 10/1989 | |
| KR | 1989-20328 | 10/1989 | |
| KR | 1991-0009310 | 5/1991 | |
| KR | 1996-13148 | 5/1996 | |
| KR | 96-15456 | 6/1996 | |
| KR | 114350 | 11/1997 | |
| KR | 1997-63717 | 12/1997 | |
| KR | 1998-4698 | 3/1998 | |
| KR | 1998-9305 | 3/1998 | |
| KR | 163133 | 9/1998 | |
| KR | 1998-54989 | 12/1998 | |
| KR | 1999-40596 | 6/1999 | |
| KR | 1999-0040596 | 6/1999 | |
| KR | 1999-0073869 | 10/1999 | |
| KR | 1999-0075223 | 10/1999 | |
| KR | 20-168389 | 11/1999 | |
| KR | 2000-722 | 1/2000 | 1/16 |
| KR | 2000-725 | 1/2000 | |
| KR | 2000-827 | 1/2000 | 1/16 |
| KR | 20-178710 | 2/2000 | 7/16 |
| KR | 20-182808 | 3/2000 | |
| KR | 20-184275 | 3/2000 | |
| KR | 20-0178710 | 4/2000 | |
| KR | 20-191805 | 5/2000 | 1/16 |
| KR | 20-0191805 | 8/2000 | |
| KR | 20-215332 | 12/2000 | |
| KR | 10-0289438 | 2/2001 | |
| KR | 2002-5136 | 2/2001 | |
| KR | 20-227925 | 4/2001 | 1/16 |
| KR | 20-227953 | 4/2001 | |
| KR | 2001-0035722 | 5/2001 | |
| KR | 20-0227925 | 6/2001 | |
| KR | 20-239991 | 7/2001 | 1/16 |
| KR | 2001-53963 | 7/2001 | |
| KR | 2001-56960 | 7/2001 | |
| KR | 2001-83865 | 9/2001 | |
| KR | 20-251611 | 10/2001 | 1/16 |
| KR | 20-253576 | 10/2001 | 1/16 |
| KR | 2001-62687 | 10/2001 | |
| KR | 20-0253576 | 11/2001 | |
| KR | 20-0256013 | 11/2001 | |
| KR | 20-256809 | 11/2001 | |
| KR | 20-259625 | 12/2001 | |
| KR | 2002-5136 | 1/2002 | |
| KR | 2002-0029616 | 4/2002 | |
| KR | 20-279427 | 6/2002 | |
| KR | 20-0279427 | 6/2002 | |
| KR | 10-353035 | 9/2002 | |
| KR | 20-295990 | 11/2002 | |
| KR | 20-304340 | 2/2003 | |
| KR | 2003-0058204 | 7/2003 | |
| KR | 2001-35722 | 5/2007 | |
| WO | 00/73027 A2 | 12/2000 | |
| WO | 00/73027 A3 | 12/2000 | |

OTHER PUBLICATIONS

U.S. Appl. No. 10/916,447, filed Aug. 12, 2004, Hyun-Jun Jung et al., Samsung.

U.S. Appl. No. 10/916,436, filed Aug. 12, 2004, Hyun-Jun Jung et al., Samsung.

U.S. Appl. No. 10/314,350, filed Dec. 1, 2002, Sang-kyeong Ha et al., Samsung Electronics Co. LTD.

U.S. Appl. No. 10/646,864, filed Apr. 1, 2003, You-Sik Hong et al., Samsung Electronics Co. LTD.
U.S. Appl. No. 10/671,605, filed Sep. 1, 2003, Jun-soo Jeong, Samsung Electronics Co. LTD.
U.S. Appl. No. 10/671,863, filed Sep. 1, 2003, Ju-hwan Kim et al., Samsung Electronics Co. LTD.
U.S. Appl. No. 10/694,029, filed Oct. 1, 2003, Nam-il Cho et al., Samsung Electronics Co. LTD.
U.S. Appl. No. 10/694,041, filed Oct. 2003, You-Sub Lee et al., Samsung Electronics Co. LTD.
U.S. Appl. No. 10/705,770, filed Nov. 1, 2003, Ju-hwan Kim et al., Samsung Electronics Co. LTD.
U.S. Appl. No. 10/792,745, filed Mar. 1, 2004, Sang-kyeong HA et al., Samsung Electronics Co. LTD.
U.S. Appl. No. 10/916,436, filed Aug. 12, 2004, Hyun-jun Jung et al., Samsung Electronics Co, LTD.
U.S. Appl. No. 10/916,447, filed Aug. 12, 2004, Hyun-jun Jung et al., Samsung Electronics Co, LTD.
U.S. Appl. No. 10/406,269, filed Apr. 4, 2003, You-sik Hong, et al, Samsung Electronics Co, LTD.
Vesa Mounting Interface Standard, Mar. 19, 2003, 2 pages, www.ergotron.com/2_Product_pages/FP_ARMS/VESA/fp_vesa.asp.
Third Party Submission document filed Aug. 27, 2004 in Korean Industrial Property Office, issued Sep. 22, 2004.
Chinese Office Action of Application No. 03110326.X issued Sep. 24, 2004.
Chinese Office Action of Application No. 03154931.4 issued Sep. 9, 2005.
Singapore Office Action issued on May 13, 2005.
Korean Office Action issued on Jul. 26, 2004.
Japanese Office Action mailed Sep. 21, 2004 in JP 2002-333914.
Japanese Office Action mailed Jun. 14, 2005 in JP 2002-333914.
Korean Office Action issued on Mar. 16, 2005.
Korean Office Action issued on Aug. 20, 2004.
SIPO Office Action issued on Sep. 9, 2005.
Korean Office Action issued on Mar. 8, 2006 in Korean Patent Application No. 10-2002-0050351 which corresponds to co-pending U.S. Appl. No. 10/646,864.
U.S. Appl. No. 11/889,998, filed Aug. 17, 2007, Ju-hwan Kim et al., Samsung Electronics Co., Ltd.
Japanese Office Action dated Jun. 25, 2007 in Japanese Patent Application No. 2005-360909.
Japanese Office Action dated Jun. 25, 2007 in Japanese Patent Application No. 2005-360911.
Japanese Office Action dated Jun. 25, 2007 in Japanese Patent Application No. 2005-360915.
Japanese Decision to Grant mailed Jul. 18, 2008 in JP 2005-360915.
European Search Report mailed Jun. 30, 2008 in European Application No. 07103148.8-1252/1790901.
European Search Report dated Apr. 25, 2008, issued in European Patent Application No. 07103148.8-1252.
Third Party Submission document filed Aug. 26, 2004 in Korean Industrial Property Office, issued Sep. 22, 2004.

* cited by examiner

US 7,604,206 B2

MONITOR IMPROVED IN A TILTING AND COMBINING STRUCTURE

CROSS-REFERENCE TO RELATED APPLICATIONS

This application claims the benefit of Korean Application No. 2001-71860, filed Nov. 19, 2001, Application No. 2002-27683, filed May 20, 2002, and Application No. 2002-56429 filed Sep. 17, 2002, in the Korean Industrial Property Office, the disclosures of which are incorporated herein by reference.

BACKGROUND OF THE INVENTION

1. Field of the Invention

The present invention relates in general to a monitor, and more particularly, to a monitor improved in tilting structure of the monitor against a base member, and improved in combining structure of the base member and an inclined plane.

2. Description of the Related Art

As shown in FIG. 1, a conventional monitor includes a base member 201 laid on a horizontal plane, a monitor main body 202 to display a picture thereon, and a link member 210 to link the base member 201 with the main body 202.

A lower part of the link member 210 is rotatably combined to the base member 201 by a pair of fixing brackets 204 and 206, and an upper part of the link member 210 is fixed with the main body 202.

Thus, along a direction of an arrow "A" in FIG. 1, the link member 210 is vertically rotated against the base member 201, but the main body 202 cannot be tilted against the link member 210. Therefore, with the conventional monitor, it is inconvenient to adjust an angle of the main body 202 as necessary.

Contrary to the monitor shown in FIG. 1, it is possible that the upper part of the link member 210 is rotatably combined to the main body 202, and the lower part of the link member 210 is fixed with the base member 201. Accordingly, the angle of the main body 202 is more efficiently adjusted.

As computer systems rapidly spread, demand of various monitor capabilities are also being rapidly increased. In relation to the increased demand of the monitor, there has been provided an arm stand to support the monitor, which is manufactured separately from the monitor and combined to the monitor, to thereby meet a user's preference. A combining structure of the monitor and the arm stand has been regulated by VESA (VIDEO ELECTRONIC STANDARD ASSOCIATION).

However, in the conventional monitor, because the base member 210 must be laid on the horizontal plane, it is impossible to install the monitor onto an inclined plane such as a wall, the arm stand, etc. Because the main body 202 is not folded to the base member 201, the monitor is packed in a state as shown in FIG. 1, or in a state that the link member 210 is folded to the base member, which is not shown. Thus, a packing volume of the monitor cannot be decreased, thereby increasing costs to keep and carry the monitor. Furthermore, if regulations regarding the angle adjustment of the main body 202 are different in various nations, it is difficult to adaptively meet regulation requirements for the angle adjustment.

SUMMARY OF THE INVENTION

Accordingly, it is an object of the present invention to provide a monitor, in which a base member is installed onto an inclined plane such as a wall, an arm stand, etc., and more particularly, to provide a monitor which is easily installed onto various arm stands according to VESA standards.

Another object of the present invention is to provide a monitor which properly adjusts a tilting angle of a main body against a base member, and decrease costs to keep and carry the monitor by minimizing the packing volume thereof.

Additional objects and advantages of the invention will be set forth in part in the description which follows and, in part, will be obvious from the description, or may be learned by practice of the invention.

The foregoing and other objects of the present invention are achieved by providing a monitor having a monitor main body and a base member to support the monitor main body, and including a link member disposed between the monitor main body and the base member. The monitor includes a base hinge coupling the link member, which rotates within a predetermined angle against the base member, with the base member. The monitor also includes a monitor hinge coupling the monitor main body, which rotates against the link member, with the link member and an auxiliary link member to link the rotation of the link member against the base member with the rotation of the monitor main body. The monitor includes a base bracket combined to the base member and allowing the base member to be installed on an inclined plane.

According to an aspect of the invention, the base bracket is detachably combined to the base member and includes hooks to hook to hook holders provided in the base member.

According to an aspect of the invention, the base bracket includes first combining holes to install the base bracket on the inclined plane.

According to an aspect of the invention, to combine the base bracket and the link member, the base bracket includes second combining holes, and the link member includes third combining holes corresponding to the second combining holes.

According to an aspect of the invention, the second combining holes of the base bracket and the third combining holes of the link member are formed according to the VESA standards.

According to another aspect of the invention, the monitor further includes first and second fixing brackets spaced from each other at a predetermined distance and installed on the base member. The base hinge includes first and second base hinge parts to rotatably combine opposite sides of a lower end part of the link member to the first and second fixing brackets.

According to an aspect of the invention, the first base hinge part includes a first pin accommodating part formed on a side of the link member, a first boss accommodating part formed on the first fixing bracket and having a noncircular section, and a first hinge pin having a first end rotatably inserted in the first pin accommodating part and a second end fitted into the first boss accommodating part.

According to an aspect of the invention, the first fixing bracket including a spring supporting part protruded from an inside thereof toward the second fixing bracket. The spring supporting part has a torsion spring placed thereon, elastically acting in an opposite direction to a downward rotation of the link member against the base member.

According to an aspect of the invention, the second base hinge part includes a second pin accommodating part formed on a side of the link member, a first link supporting part coupled to the second fixing bracket and formed with a second boss accommodating part therein, a second hinge pin having a first end rotatably inserted in the second pin accommodating part, and a second end engaged with the second boss accommodating part of the first link supporting part.

According to another aspect of the invention, at least one of the first and second base hinge parts has a tilt resticting device placed thereon to restrict the rotation of the link member against the base member within a predetermined angle range.

According to an aspect of the invention, the tilt resticting device includes first and second stoppers formed on opposite sides of the link member adjacent to the first and second pin accommodating part to face each other. The tilt restricting device also includes a pair of projections provided on the first and second boss accommodating parts and selectively engaged with the first and second stoppers according to a rotation direction of the link member.

According to yet another aspect of the invention, the monitor further includes a supporter combined to the monitor main body. The monitor hinge includes first and second monitor hinge parts to rotatably combine opposite sides of an upper end part of the link member to the supporter.

According to an aspect of the invention, the first monitor hinge part includes a first hinge accommodating part grooved on one side of the supporter, a first hinge holder formed on one side of the upper end part of the link member, and an accommodating part cover placed on an opening of the first hinge accommodating part in a state that the first hinge holder is arranged in the first hinge accommodating part.

According to an aspect of the invention, the second monitor hinge part includes a third pin accommodating part formed on the other side of the supporter, a second hinge accommodating part formed on the other side of the upper end part of the link member, a second hinge holder rotatably inserted in the second hinge accommodating part from an outside of the link member. The second monitor hinge part also includes a second link supporting part including the second hinge holder, and a third boss accommodating part formed inside the second hinge holder. The second monitor hinge part includes a third hinge pin having a first end rotatably inserted in the third pin accommodating part of the supporter and a second end fitted into the third boss accommodating part of the second link supporting part.

According to an aspect of the invention, the second monitor hinge part is provided with a monitor angle restricting device to restrict a tilt of the monitor main body against the link member within a predetermined angle range.

According to an aspect of the invention, the monitor angle restricting device includes a third stopper of an arced shape protruded from an opening of the third pin accommodating part formed on the supporter and a rotation-restricting washer put on the third hinge pin and having a projection to be selectively engaged with the third stopper according to a rotation direction of the monitor main body. The monitor angle restricting device also includes a flat spring combined to a side adjacent to the third pin accommodating part of the supporter, and restricting a rotation of the supporter by pressing the projection of the rotation-restricting washer.

According to an aspect of the invention, the flat spring includes a projection elastically deformed and fastened to the other side of the supporter.

According to yet another aspect of the invention, the auxiliary link member is provided in pairs in parallel with each other and combined to the first and second link supporting parts.

According to an aspect of the invention, on each of the first and second link supporting parts are provided a plurality of pin holes spaced from each other at a predetermined distance. On opposite ends of each auxiliary link member are formed through holes to be communicated with the pin holes, respectively, and to the through holes and the pin holes are inserted link fixing pins.

According to another aspect of the invention, on the link member is provided a cable accommodating part to accommodate cables connecting at least one first cable port provided in the base member with at least one second cable port connected to the monitor main body. The first hinge holder and the first hinge accommodating part of the supporter is provided with a cable accommodating groove to accommodate the cables.

According to an aspect of the invention, the monitor main body is folded on the base member, and the link member is accommodated in a link member accommodating part formed in a middle of a surface of the base member.

According to an aspect of the invention, the second link supporting part provided in the upper end part of the link member is rotated by the auxiliary link member when the link member is rotated. The monitor main body is tilted together with the second link supporting part at a same angle.

The foregoing and other objects of the present invention are achieved by providing a monitor having a main body and a base member supporting the main body including a link member disposed between the main body and the base member, a base hinge coupling the link member, to be rotated within a predetermined angle against the base member, with the base member, a monitor hinge coupling the main body, to be rotated against the link member, with the link member, and an auxiliary link member linking the rotation of the link member against the base member with the rotation of monitor main body. The monitor further includes a pair of fixing brackets spaced from each other at a predetermined distance and installed on the base member. The base hinge includes first and second base hinge parts rotatably combining a lower end part of the link member to the pair of fixing brackets.

According to an aspect of the invention, the first base hinge part includes a first pin accommodating part formed on one side of the lower end part of the link member, a boss accommodating part formed on the first fixing bracket and having a noncircular section, and a first hinge pin having a first end rotatably inserted in the first pin accommodating part and a second end fitted into the boss accommodating part.

According to an aspect of the invention, the first hinge pin is placed a first torsion spring having a first end coupled to the one side of the lower end part of the link member and a second end coupled to the first fixing bracket, and elastically acting in an opposite direction to a downward rotation of the link member against the base member. Thus, the first torsion spring allows the link member to be positioned in place.

According to another aspect of the invention, the second base hinge part includes a second pin accommodating part formed on the other side of the lower end part of the link member, a first link supporting part coupled to the second fixing bracket and formed with a spline accommodating part and, a first hinge pin having a first end rotatably inserted in the second pin accommodating part and a second end engaged with the spline accommodating part of the first link supporting part.

According to an aspect of the invention, the second base hinge part is placed a rotation-angle restricting device to restrict the rotation of the link member against the base member within a predetermined angle range.

According to an aspect of the invention, the rotation-angle restricting device includes a pair of first stoppers formed at a side of the lower end part of the link member adjacent to the second pin accommodating part to face each other, and a first rotation-restricting washer placed on the second hinge pin and having a pair of projections to be selectively engaged with the pair of first stoppers according to a rotation direction of the link member. The first rotation-restricting washer is fitted to the second hinge pin.

According to yet another aspect of the invention, the monitor further includes a supporter combined to the main body. The monitor hinge includes first and second monitor hinge parts rotatably combining an upper end part of the link member to the supporter.

According to an aspect of the invention, the first monitor hinge part includes a third pin accommodating part formed on one side of the supporter, a fourth pin accommodating part formed on one side of the upper end part of the link member, and a third hinge pin having ends inserted in the third and fourth pin accommodating parts, respectively.

According to an aspect of the invention, the second monitor hinge part includes a fifth pin accommodating part formed on the other side of the supporter, a sixth pin accommodating part formed on the other side of the upper end part of the link member and, a second link supporting part rotatably inserted in the sixth pin accommodating part from an outside of the link member and formed with a spline accommodating part. The second monitor hinge part also includes a fourth hinge pin having a first end fitted into the fifth pin accommodating part of the supporter, and a second end engaged with the spline accommodating part of the second link supporting part.

According to another aspect of the invention, the second monitor hinge part is provided a monitor angle restricting device to restrict the rotation of the main body against the link member within a predetermined angle range.

According to an aspect of the invention, the monitor angle restricting device includes a second stopper of an arced shape protruded from one side of the supporter adjacent to the fifth pin accommodating part, a second rotation-restricting washer placed on the fourth hinge pin and having a projection to be engaged with the second stopper according to the rotation direction of the main body, and a third stopper combined to the one side of the supporter and locked on and released from the projection of the second rotation-restricting washer.

According to an aspect of the invention, the monitor further includes a second torsion spring combined to the one side of the supporter, and elastically biasing the third stopper in a direction in which the third stopper is engaged with the projection of the second rotation-restricting washer.

According to another aspect of the invention, the monitor further includes a spacer provided between the second link supporting part and the second rotation-restricting washer.

According to an aspect of the invention, the monitor further includes an auxiliary link member linking the rotation of the link member against the base member with the rotation of the main body.

BRIEF DESCRIPTION OF THE DRAWINGS

The above and other objects and advantages of the present invention will become apparent and more readily appreciated from the following description of the preferred embodiments, taken in conjunction with the accompany drawings of which.

DETAILED DESCRIPTION OF THE PREFERRED EMBODIMENTS

Figure 1:
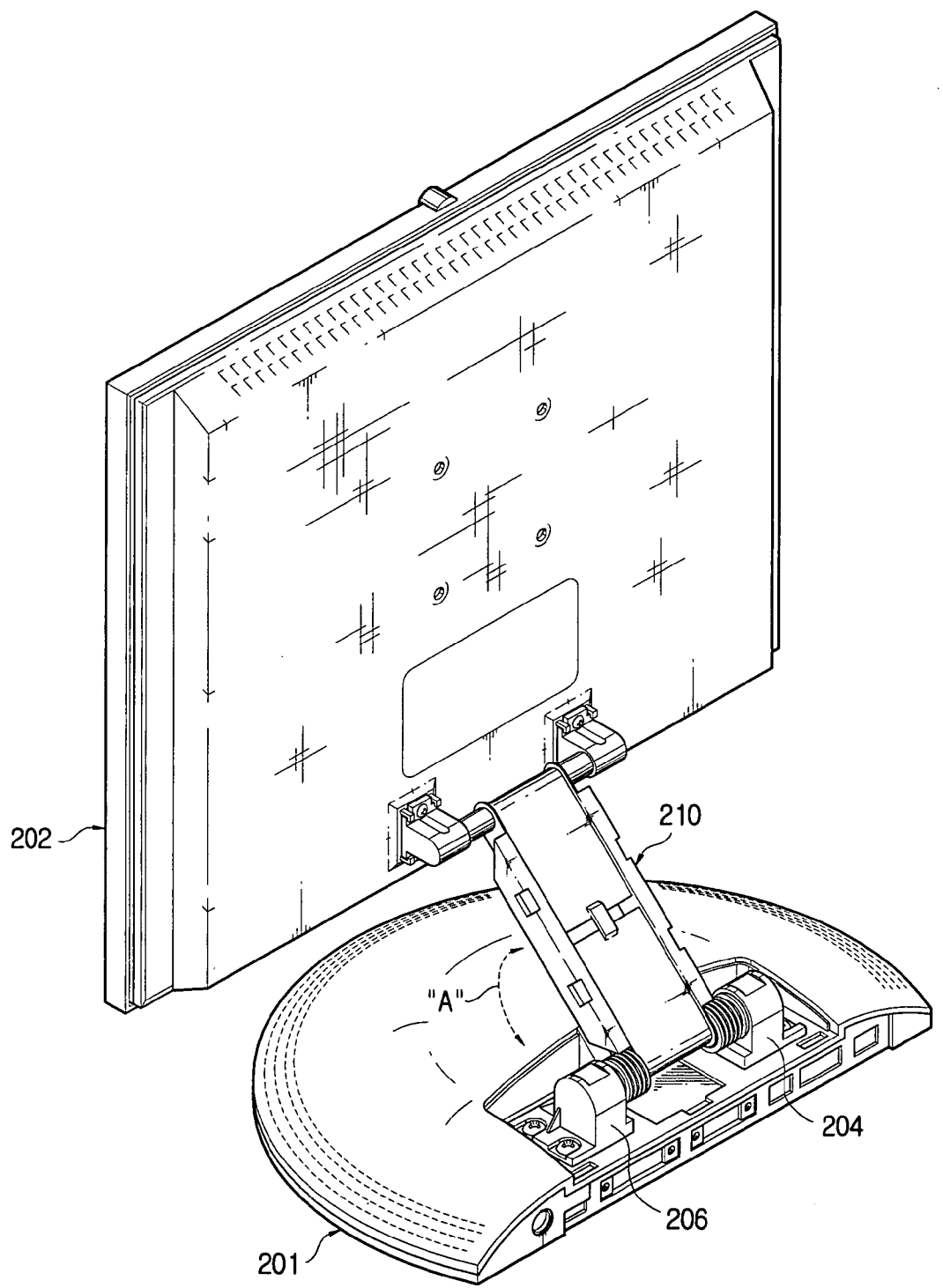
FIG. 1 is a perspective view illustrating a rear of a conventional monitor.

Reference will now be made in detail to the present preferred embodiments of the present invention, examples of which are illustrated in the accompanying drawings, wherein like reference numerals refer to like elements throughout.

Figure 2:
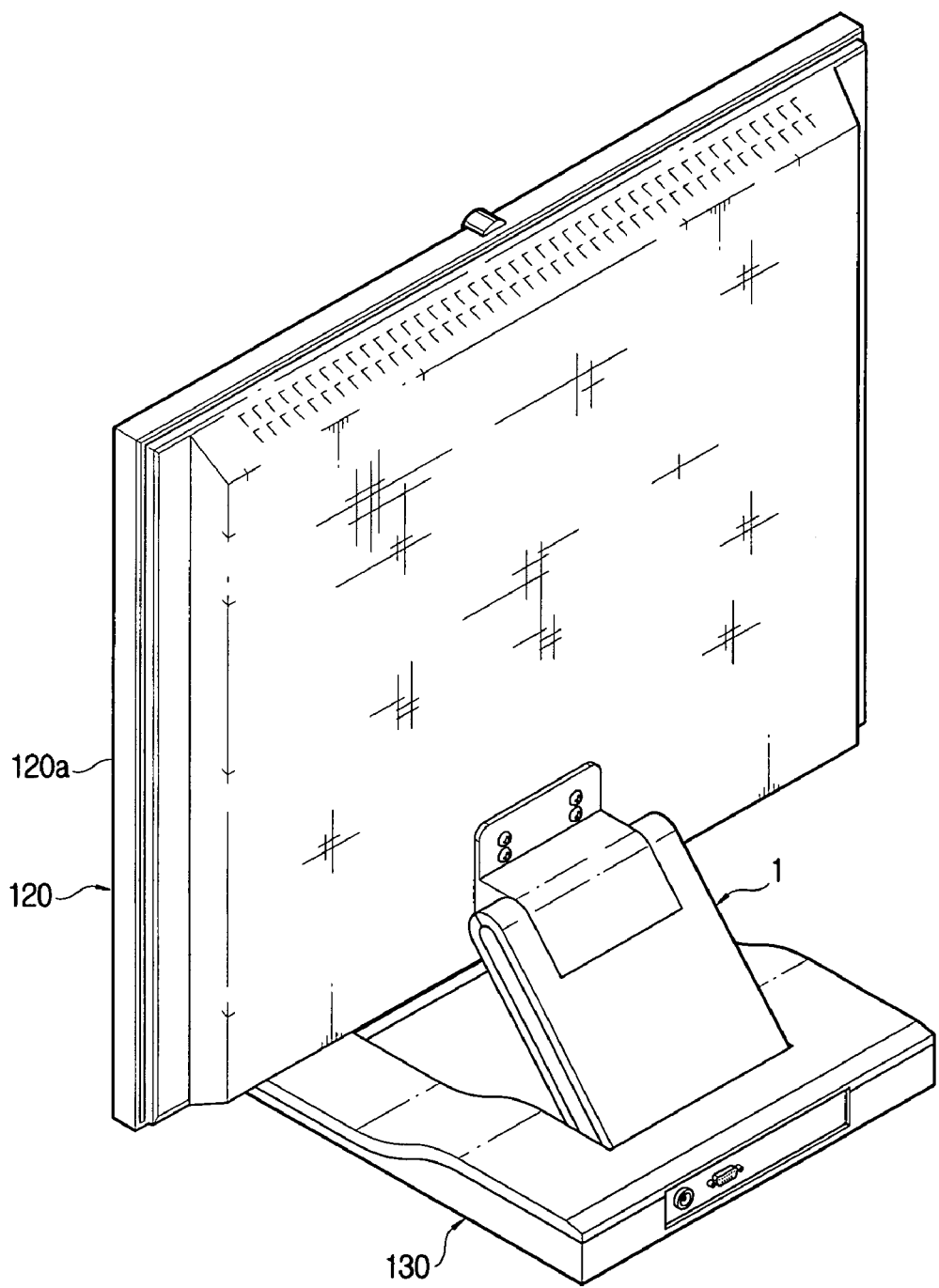
FIG. 2 is a perspective view illustrating a rear of a monitor, according to an embodiment of the present invention.
Figure 3:
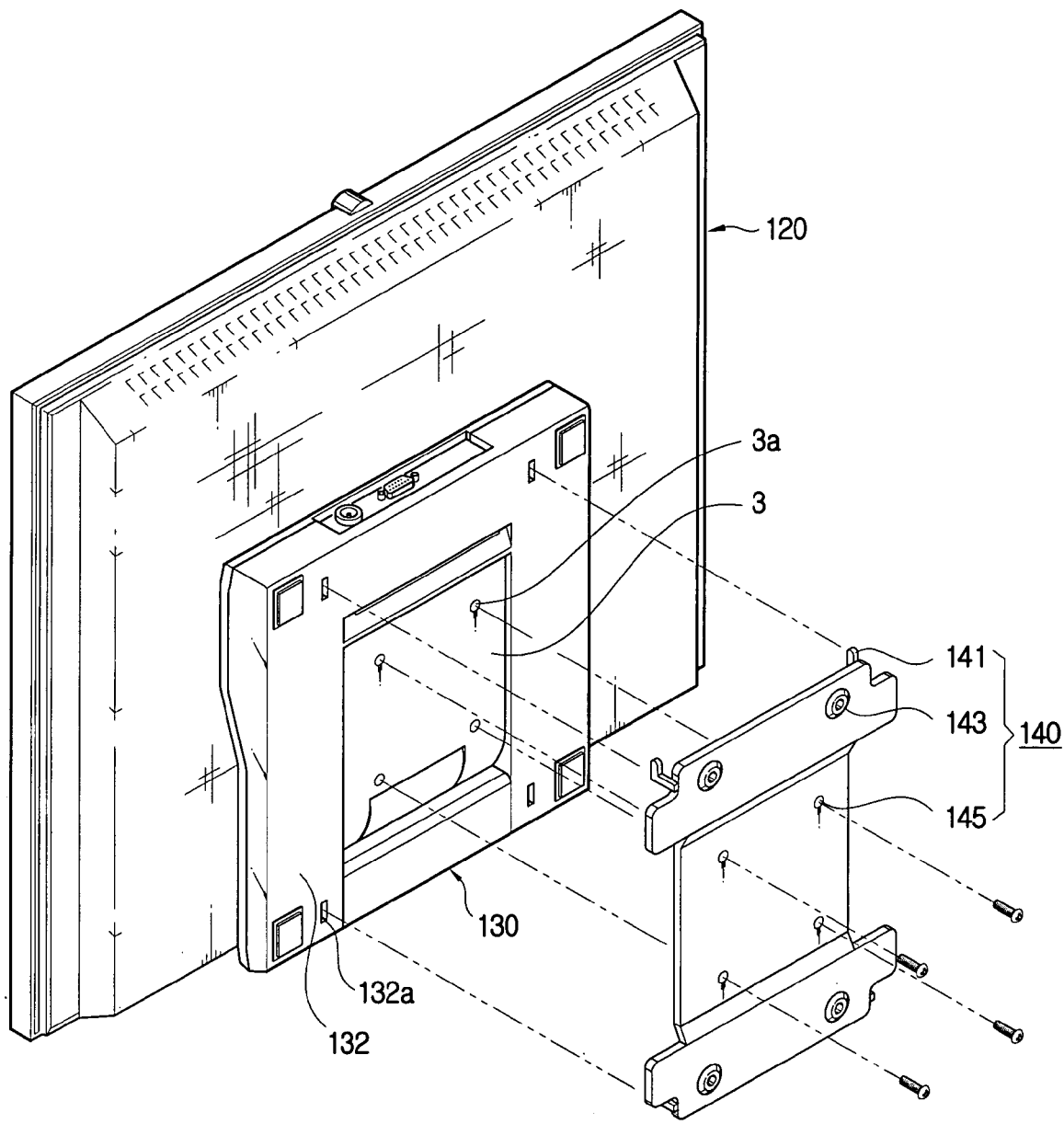
FIG. 3 is a perspective view illustrating the rear of the monitor of FIG. 2, in which a base member and a base bracket are separated.

As shown in FIGS. 2 and 3, a monitor according to an embodiment of the present invention includes a base member 130 laid on a predetermined horizontal plane and a monitor main body 120 having a screen 120a to display a picture. The monitor also includes a link assembly 1 linking the base member 130 with the monitor main body 120 and a base bracket 140 having a first side combined to a rear of the base member 130 and a second side combined to an inclined plane including a vertical plane such as a wall, an arm stand, etc.

The base bracket 140 includes a plurality of hooks 141 provided in the first side combined to the rear of the base member 130, a plurality of first combining holes 143 to combine with the inclined plane such as a wall, and a plurality of second combining holes 145 to combine with an arm stand according to VESA.

Figure 4:
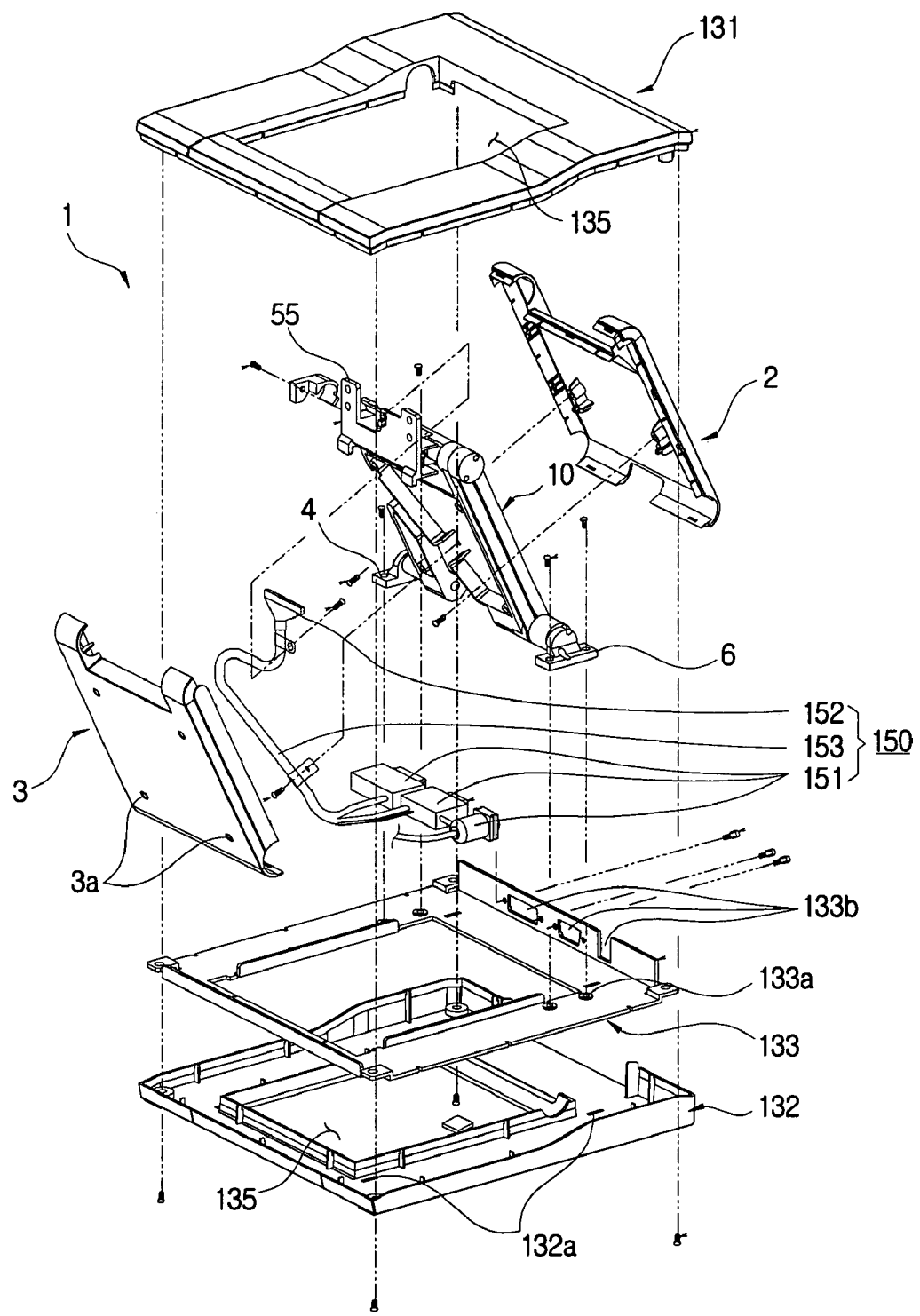
FIG. 4 is a partially exploded perspective view of a link assembly and the base member of the monitor in FIG. 2.
Figure 5:
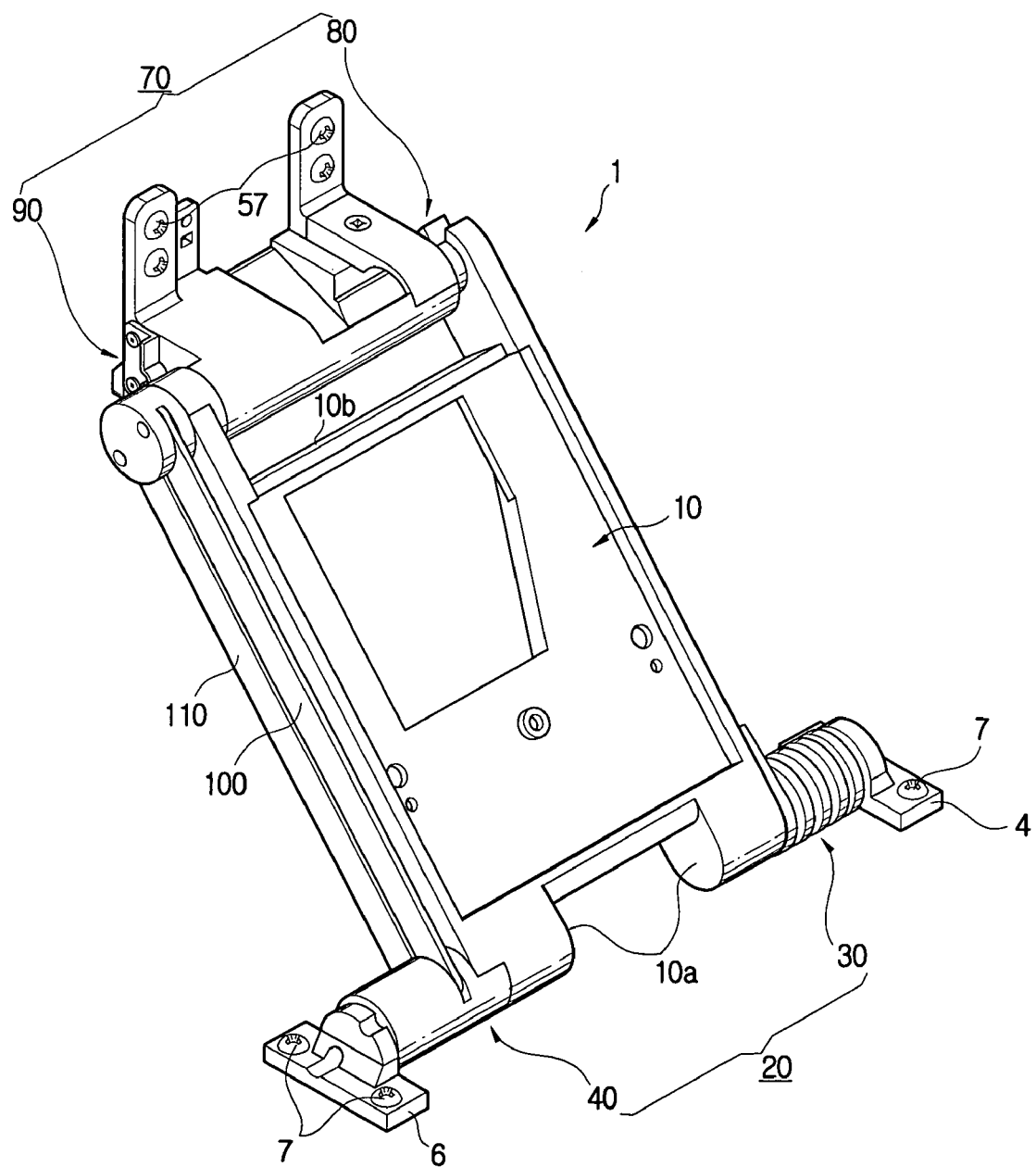
FIG. 5 is an enlarged perspective view of the link assembly of FIG. 4.
Figure 6:
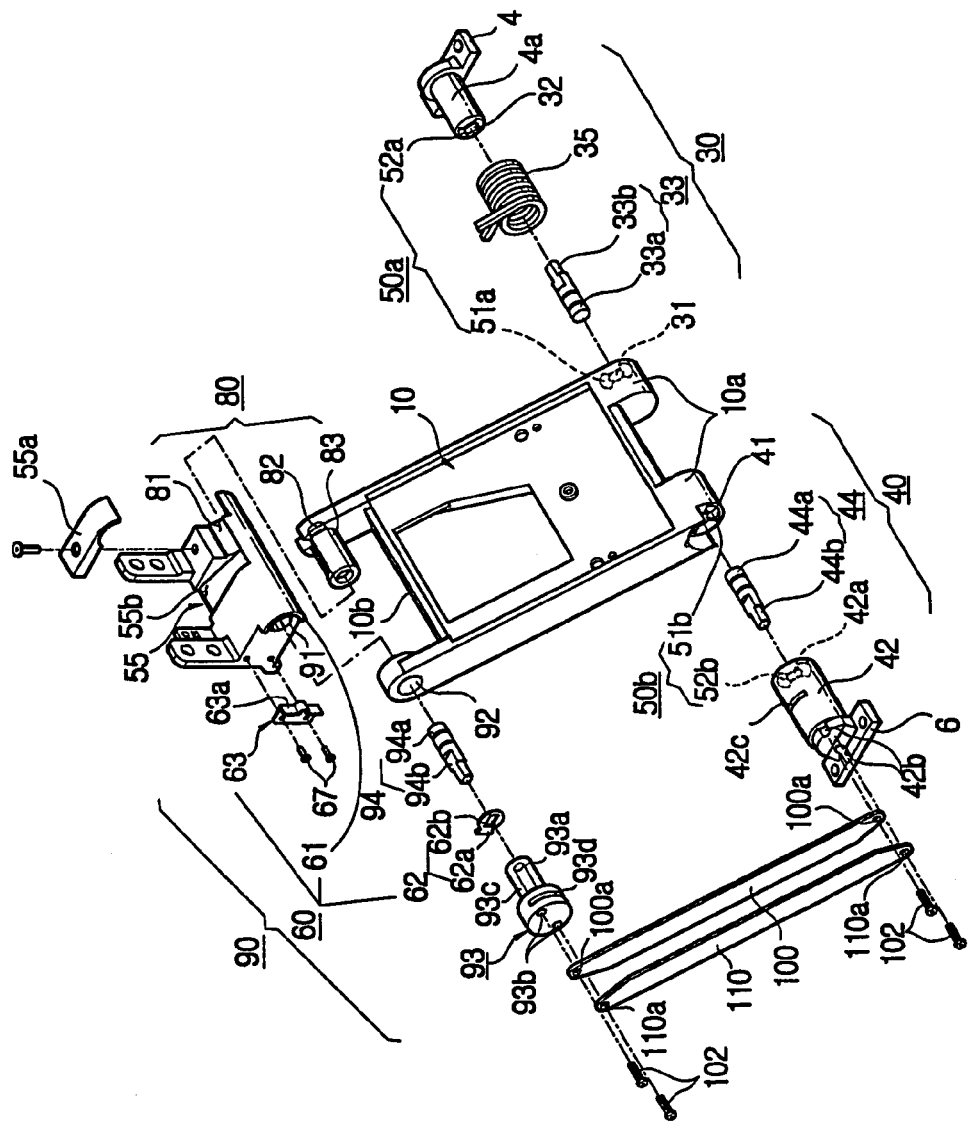
FIG. 6 is an exploded view of the link assembly of FIG. 5.

As shown in FIGS. 4 through 6, the base member 130 of the monitor includes a base supporting part 133 formed with a plurality of base combining holes 133a to which first and second fixing brackets 4 and 6 (to be described later) are combined, an upper base cover 131 provided on an upper part of the base supporting part 133, and a lower base cover 132 provided on a lower part of the base supporting part 133.

Further, the base member 130 includes a link member accommodating part 135 formed in a middle of a surface thereof and accommodating the link assembly 1, and a plurality of port receiving parts 133b to receive a plurality of first cable ports 151 of a cable assembly 150 (to be described later). Further, on a surface of the lower base cover 132 is formed a plurality of hook holders 132a (see FIG. 3) to hold the hooks 141 of the base bracket 140. Herein, the base supporting part 133 formed with the port receiving parts 133b and the base combining holes 133a may be incorporated with the lower base cover 132 or the upper base cover 131.

The cable assembly 150 includes the plurality of first cable ports 151 such as a cable port and a power port, which are fastened to the port receiving parts 133b and connected to a computer main body (not shown). The cable assembly 150 also includes a second cable port 152 connected to the monitor main body 120, and a cable 153 accommodated in a link member 10 to connect the first cable port 151 and the second cable port 152.

The link assembly 1 includes the link member 10 provided between the monitor main body 120 and the base member 130, an upper link member cover 2 provided on an upper part 10b of the link member 10, a lower link member cover 3 provided on a lower part 10a of the link member 10, a base hinge 20 rotatably connecting the lower part 10a of the link member 10 with the base member 130, and a monitor hinge 70 rotatably connecting the upper part 10b of the link member 10 with the monitor main body 120. Herein, the lower link member cover 3 is formed with a plurality of third combining holes 3a corresponding to the plurality of second combining holes 145 of the base bracket 140 so as to combine with an arm stand 170 (to be described later, see FIG. 12).

The link member 10 rotates against the base member 130 within a predetermined angle range. The range of the tilting angle may be determined based on regulation requirements in various nations, for example, 0° through 65°.

The base hinge 20 is combined to the first and second fixing brackets 4 and 6 which are spaced from each other at a predetermined distance and fastened onto the base supporting part 133 of the base member 130 with bolts 7. The base hinge 20 includes first and second base hinge parts 30 and 40 rotatably connecting opposite sides of the lower part 10a of the link member 10 with the first and second fixing brackets 4 and 6, respectively. Further, the first fixing bracket 4 includes a spring supporting part 4a protruding from the first fixing bracket 4 toward the second fixing bracket 6.

The first base hinge part 30 includes a first pin accommodating part 31 formed on a right side of the lower part 10a of the link member 10, a first boss accommodating part 32 formed in the spring supporting part 4a of the first fixing bracket 4, and a first hinge pin 33 having first and second ends 33a and 33b coupled to the first pin accommodating part 31 and the first boss accommodating part 32, respectively. The first end 33a of the first hinge pin 33 is rotatably inserted into the first pin accommodating part 31, and the second end 33b thereof is nonrotatively fitted into the first boss accommodating part 32. Thus, the first end 33a of the first hinge pin 33 and the first pin accommodating part 31 have circular shaped sections, and the second end 33b of the first hinge pin 33 and the first boss accommodating part 32 have noncircular shaped sections.

A torsion spring 35 is put on the spring supporting part 4a of the first fixing bracket 4. The torsion spring 35 has one end supported by the right side of the lower part 10a of the link member 10 on which the first pin accommodating part 31 is formed, and the other end supported by the first fixing bracket 4. Further, the torsion spring 35 has elasticity acting in an opposite direction to downward tilting of the link member 10 against the base member 130. However, a restoring force of the torsion spring 35 is too weak to restore the link member 10 to an original position after the link member 10 is downwardly pressed toward the base member 130. Thus, when the link assembly 1, under a state as shown in FIG. 2, is downwardly pressed toward the base member 130, the link assembly 1 is slowly moved by the elasticity of the torsion spring 35.

The second base hinge part 40 includes a second pin accommodating part 41 formed on a left side of the lower part 10a of the link member 10, a first link supporting part 42 incorporated with the second fixing bracket 6 and formed with a second boss accommodating part 42a therein, and a second hinge pin 44 having first and second ends 44a and 44b coupled to the second pin accommodating part 41 and the second boss accommodating part 42a, respectively. Like the first hinge pin 33, the first end 44a of the second hinge pin 44 has a circular shaped section and is rotatably inserted into the second pin accommodating part 41. The second end 44b thereof is irrotatively fitted into the second boss accommodating part 42a.

The first and second base hinge parts 30 and 40 are provided with tilt restricting devices 50a and 50b, respectively, to restrict the tilt of the link member 10 against the base member 130 within a predetermined range. Herein, the tilt restricting devices 50a and 50b are designed to be fit for tilting angle regulations according to VESA.

Figure 8A:
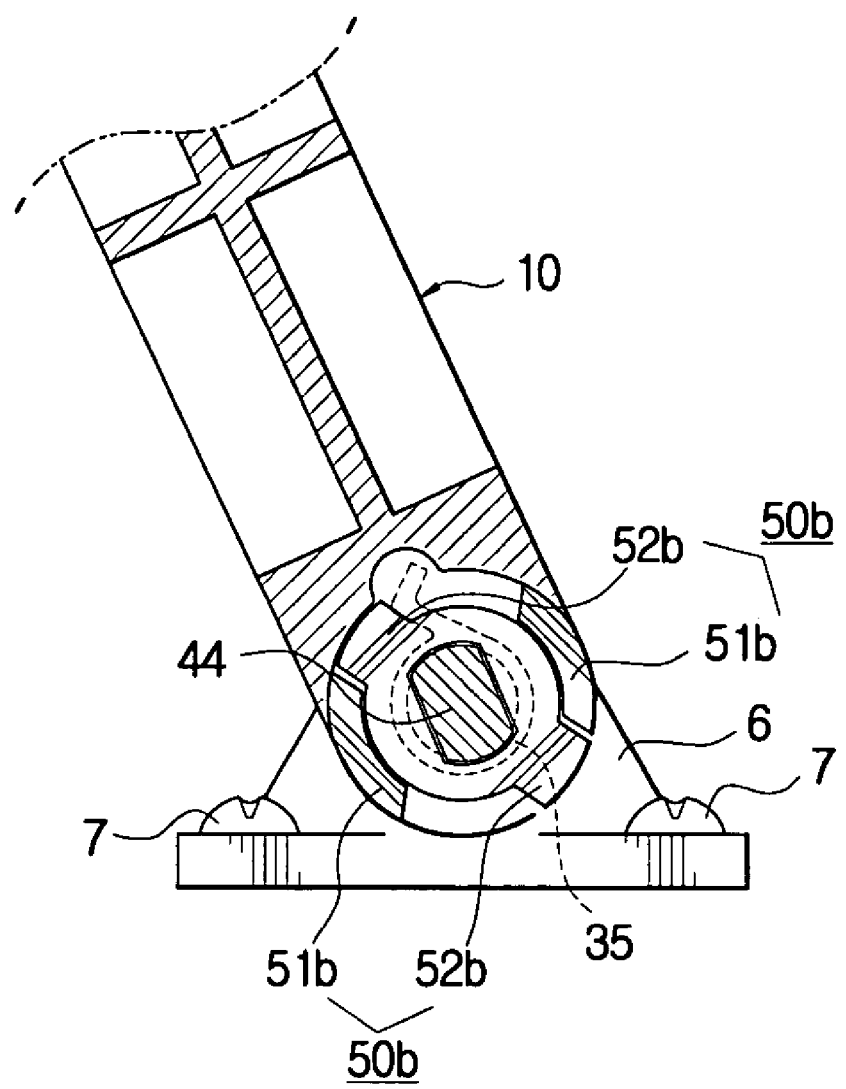
FIGS. 8A through 8C are partially enlarged sectional views illustrating a base hinge part according to the operating state of the monitor in FIGS. 7A through 7D.

As shown in FIGS. 6 and 8A, the tilt restricting device 50a includes a pair of first stoppers 51a and a pair of first projections 52a. Herein, the pair of first stoppers 51a is formed by cutting a fan shaped groove in the lower part 10a of the link member 10 around the first pin accommodating part 31 to face each other. The pair of first projections 52a is provided around the first boss accommodating part 32 accommodating the first hinge pin 33, and is selectively engaged with the pair of first stoppers 51a according to a tilting direction of the link member 10.

Similarly, the tilt resticting device 50b includes a pair of second stoppers 51b and a pair of second projections 52b. Herein, the pair of second stoppers 51b is formed by cutting a fan shaped groove in the lower part 10a of the link member 10 around the second pin accommodating part 41 to face each other. The pair of second projections 52b is provided around the second boss accommodating part 42a accommodating the second hinge pin 44, and is selectively engaged with the pair of second stoppers 51b according to the tilting direction of the link member 10.

Figure 8B:
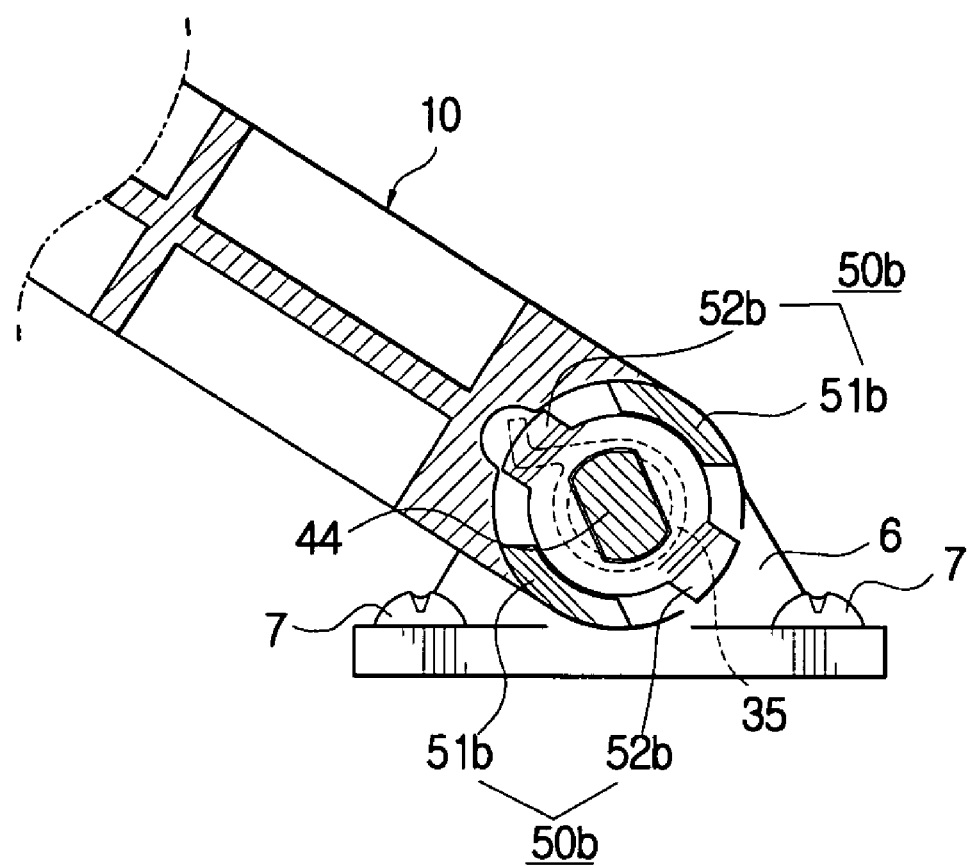
Figure 8C:
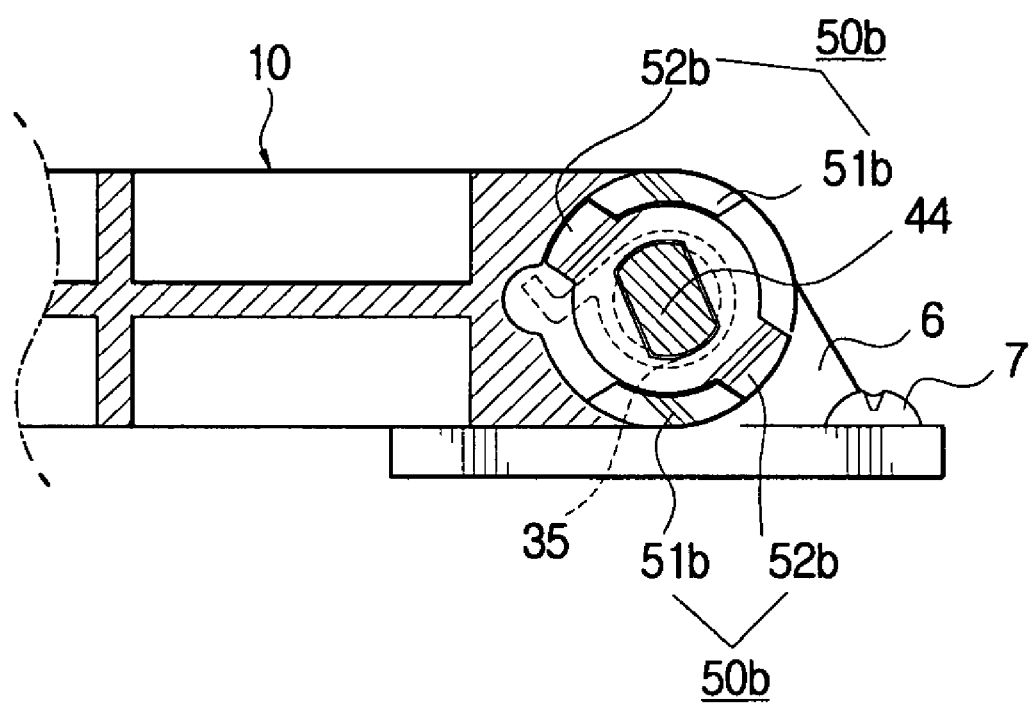

Therefore, if the link member 10 is downwardly pressed against the base member 130, the link member 10 rotatably combined to the first and second hinge pins 33 and 44 is downwardly tilted until the first and second stoppers 51a and 51b are each engaged with the first and second projections 52a and 52b of the first and second boss accommodating parts 32 and 42a at a downward-tilting limit position (see FIGS. 8B and 8C).

To the contrary, if the link member 10 is upwardly pressed from the base member 130, the link member 10 is upwardly tilted by the first and second hinge pins 33 and 44 until the first and second stoppers 51a and 51b are each engaged with the first and second projections 52a and 52b at an upward-tilting limit position (see FIG. 8A).

Thus, the tilting angle of the link member 10 against the base member 130 may be determined by the tilt resticting devices 50a and 50b, which include the pair of first stoppers 51a, the pair of second stoppers 51b, the pair of first projections 52a, and the pair of second projections 52b. Therefore, if a rotatable angle of the link member 10 is different in various nations, the rotatable angle of the link member 10 may be properly designed as necessary by altering sizes of the projections 52a, 52b and the stoppers 51a, 51b.

At the upper part 10b of the link member 10 is provided the monitor hinge 70 (see FIG. 5) by which the monitor main body 120 is tilted against the link member 10 within a predetermined angle range. The range of the tilting angle may be properly determined based on regulation requirements in various nations, for example, −5° through 30°.

The monitor hinge 70 includes first and second monitor hinge parts 80 and 90, respectively, rotatably combined to opposite sides of a supporter 55 fastened to the monitor main body 120 with bolts 57.

The first monitor hinge part 80 (see FIGS. 5 and 6) includes a first hinge holder 83 protruding from an upper right part of the link member 10 in a left direction, a first hinge accommodating part 81 grooved on a right side of the supporter 55 and having an upwardly opening, and an accommodating part cover 55a covering the opening of the first hinge accommodating part 81 in a state that the first hinge holder 83 is arranged in the first hinge accommodating part 81. Thus, the first hinge holder 83 of the link member 10 is arranged in the first hinge accommodating part 81 of the supporter 55, and then the opening of the first hinge accommodating part 81 is covered with the accommodating part cover 55a, thereby allowing the monitor main body 120 to be tilted against the link member 10.

The second monitor hinge part 90 (see FIGS. 5 and 6) includes a third pin accommodating part 91 formed on a left side of the supporter 55, a second hinge accommodating part 92 formed at a left side of the upper part 10b of the link member 10, a second hinge holder 93c rotatably inserted into the second hinge accommodating part 92, and a third boss accommodating part 93a formed at a right side of the second hinge holder 93c. The second monitor hinge part 90 also includes a second link supporting part 93 including the second hinge holder 93c and the third boss accommodating part 93a and a third hinge pin 94 having a first end 94a rotatably fitted in the third pin accommodating part 91 of the supporter 55 and a second end 94b matched to the third boss accommodating part 93a of the second link supporting part 93.

The third hinge pin 94 includes the first end 94a rotatably inserted in the third pin accommodating part 91 formed on the left side of the supporter 55, and the second end 94b having a noncircular section and matched to the third boss accommodating part 93a of the second link supporting part 93. Herein, the third hinge pin 94 should be rotatably combined to the third pin accommodating part 91 of the supporter 55 by a force stronger than torque due to a weight of the monitor main body 120. Therefore, in order to rotate the monitor main body 120 against the base member 10, a predetermined force is required. On the other hand, the second hinge holder 93c of the second link supporting part 93 combined to third hinge pin 94 is rotatably combined with the second hinge accommodating part 92, and a rotation between the second hinge holder 93c of the second link supporting part 93 and the second hinge accommodating part 92 is achieved by auxiliary link members 100 and 110 (to be described later) which are combined to and geared with the second link supporting part 93.

The second monitor hinge part 90 is provided with a monitor angle restricting device 60 to restrict a tilting angle of the monitor main body 120 against the link member 10 within a predetermined angle range. The monitor angle restricting device 60 is designed to be fit for the rotatable angle of the monitor main body 120 against the link member 10.

The monitor angle restricting device 60 (see FIG. 6) includes an arc-shaped third stopper 61 and, protrudes from the left side of the supporter 55 adjacent to the third pin accommodating part 91. The monitor angle restricting device 60 also includes a rotation-restricting washer 62 placed on the third hinge pin 94 and having a projection 62a to be engaged with the third stopper 61 according to the rotation direction of the monitor main body 120. The monitor angle restricting device 60 includes a flat spring 63 combined to the left side of the supporter 55 to restrict the rotation of the supporter 55 by pressing the projection 62a.

On the rotation-restricting washer 62 is formed a noncircular-shaped through hole 62b. The through hole 62b of the rotation-restricting washer 62 is fixedly matched to the third hinged pin 94, and therefore the rotation-restricting washer 62 is rotated together with the third hinge pin 94.

The flat spring 63 has a projection 63a protruded therefrom and elastically deformed by contact with the projection 62a of the rotation-restricting washer 62. The flat spring 63 also has a vertically extended part fastened to the left side of the supporter 55 with bolts 67.

Figure 9A:
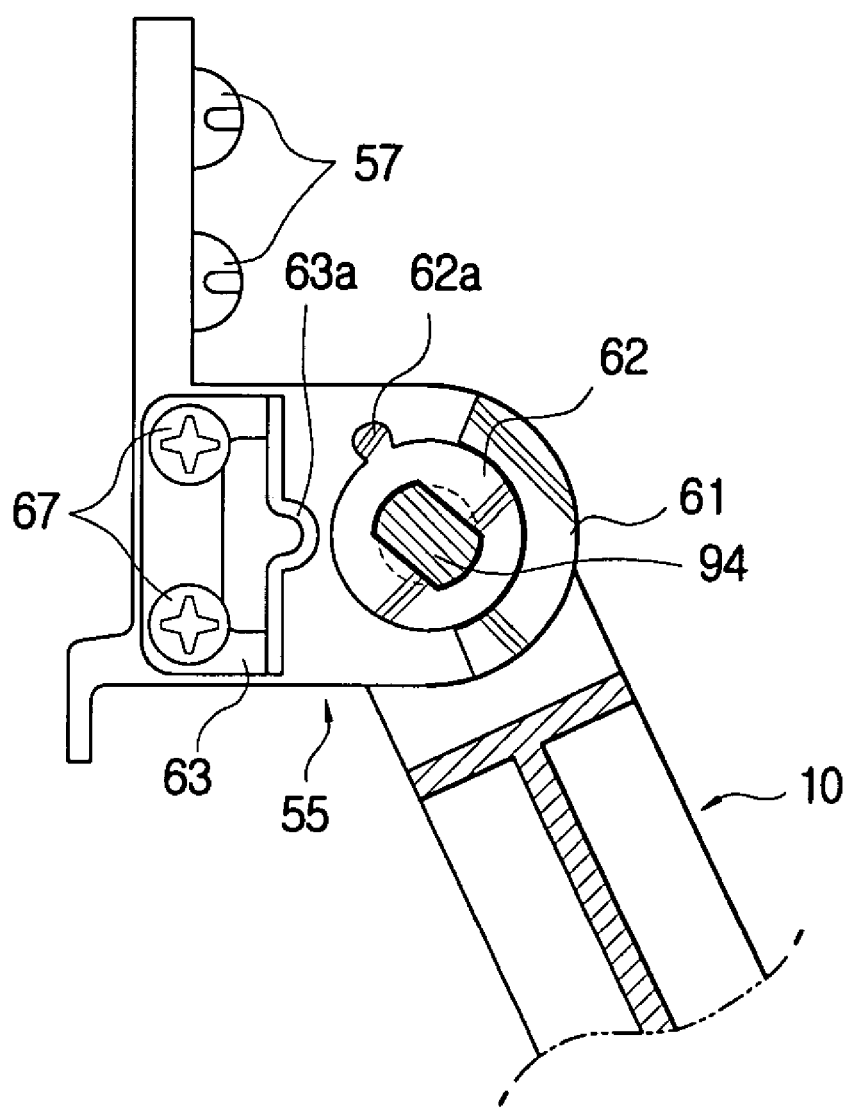
FIGS. 9A through 9D are partially enlarged sectional views illustrating a monitor hinge part according to the operating state of the monitor in FIGS. 7A through 7D.
Figure 9B:
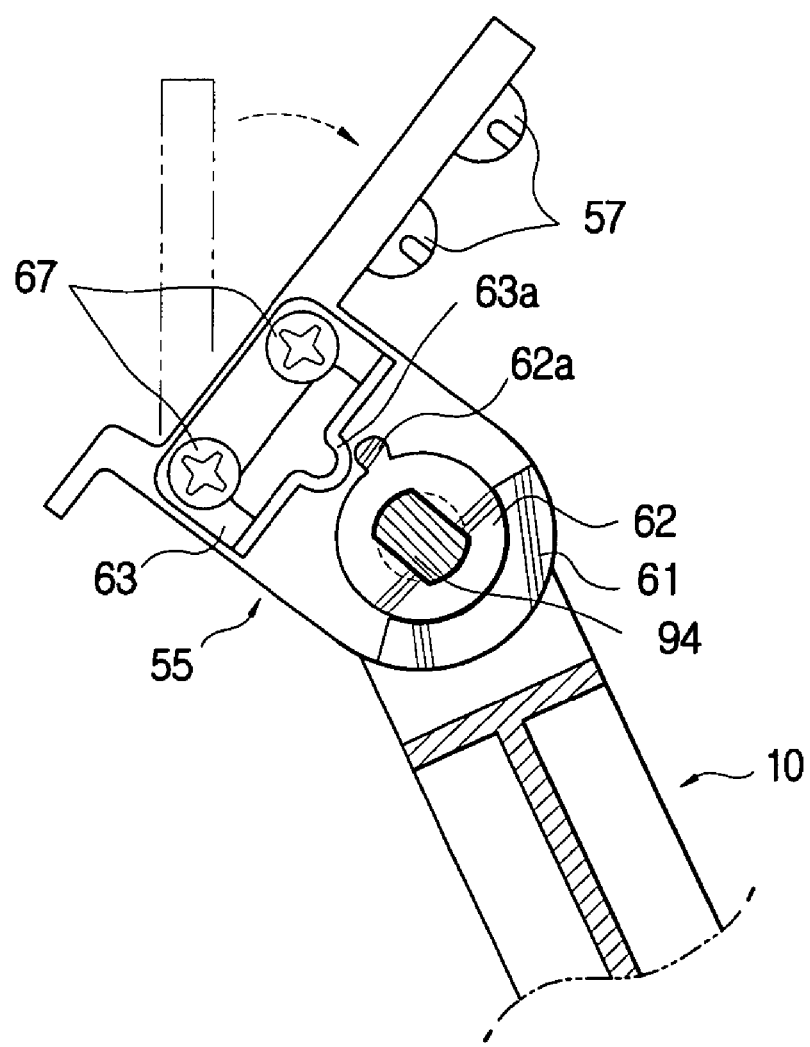

Thus, when the monitor main body 120 is forwardly pressed against the link member 10, the supporter 55 combined to the monitor main body 120 is forwardly rotated on the first hinge holder 83 and the third hinge pin 94 at a predetermined angle until the projection 62a of the rotation-restricting washer 62 combined to the third hinge pin 94 is engaged with one side of the third stopper 61 formed in the left side of the supporter 55 (see FIG. 9A). Oppositely, when the monitor main body 120 is backwardly pressed against the link member 10, the supporter 55 combined to the monitor main body 120 is backwardly rotated on the first hinge holder 83 and the third hinge pin 94 at a predetermined angle until the projection 62a of the rotation-restricting washer 62 combined to the third hinge pin 94 is engaged with the projection 63a of the flat spring 63 provided in the left side of the supporter 55 (see FIG. 9B).

Therefore, if an allowable tilting angle of the monitor main body 120 varies in different nations, the tilting angle of the main body 120 may be properly designed as necessary by altering sizes of the projection 62a and the third stopper 61, and by altering a position of the flat spring 63.

Figure 9C:
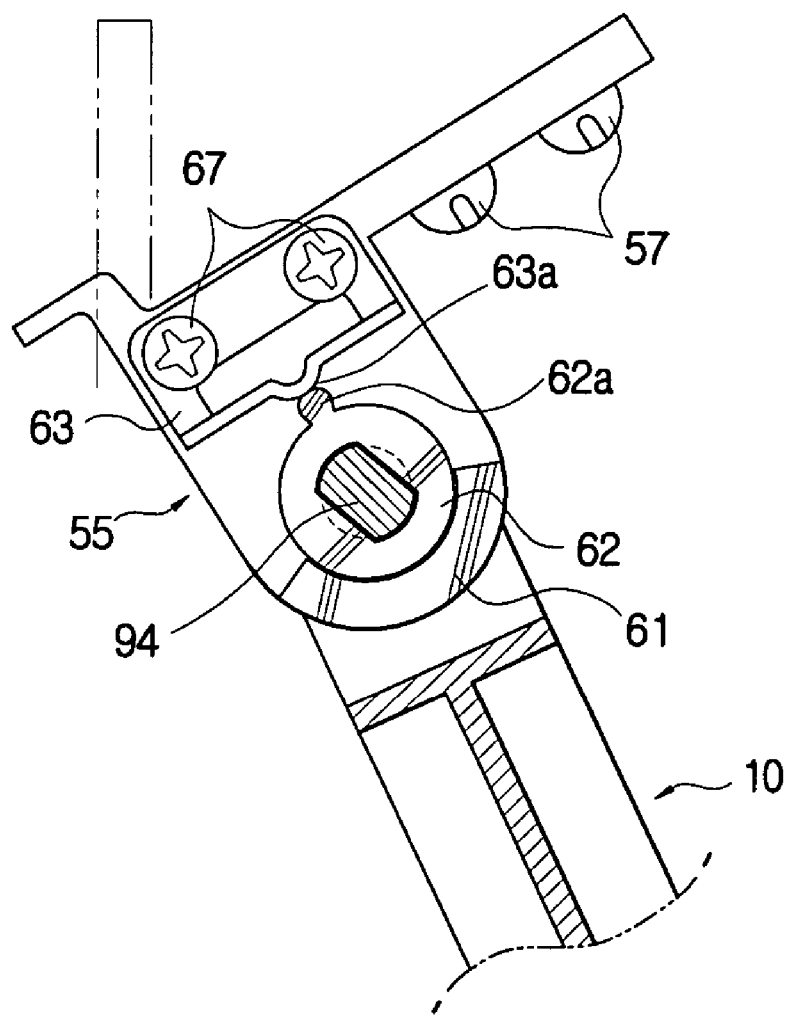
Figure 9D:
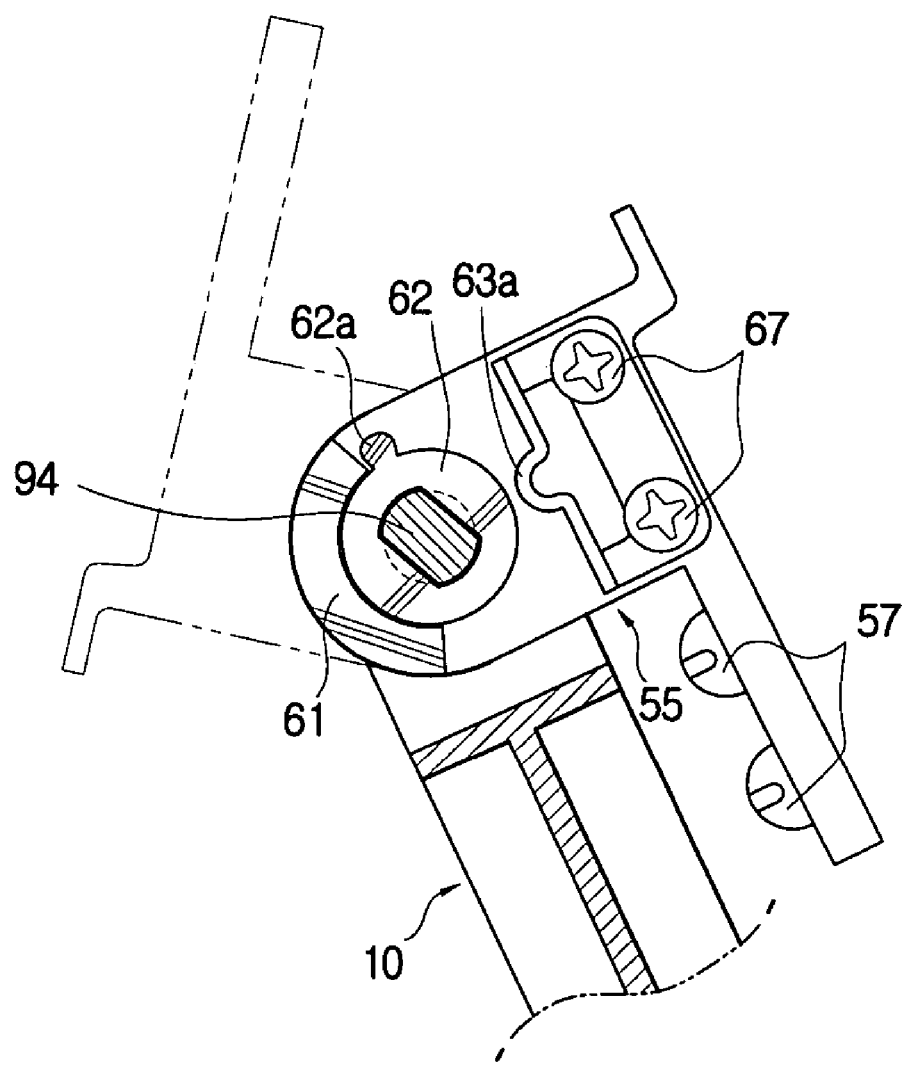

Thus, folding the monitor main body 120 to the base member 130 in parallel is performed by pressing the monitor main body 120, which is stopped in a state that the projection 62a of the rotation-restricting washer 62 is engaged with the projection 63a of the flat spring 63 fastened to the supporter 55, backwardly enough to deform the projection 63a of the flat spring 63 elastically, thereby allowing the projection 62a of the rotation-restricting washer 62 to rotate over the projection 63a of the flat spring 63 and to be engaged with the other side of the third stopper 61 (see FIGS. 9C and 9D).

Oppositely, restoring the folded monitor main body 120 to an original position is performed by pressing the monitor main body 120 forwardly in reverse to the order described above.

With this configuration, the link member 10 rotates against the base member 130 at a predetermined angle, and the monitor main body 120 rotates against the link member 10 at a predetermined angle. Further, the link member 10 and the monitor main body 120 may not be individually rotated. For example, the monitor main body 120 may be rotated at the predetermined angle (e.g., like the foregoing restricted tilting angle) by interlocking with the rotation of the link member 10 against the base member 130.

To accomplish the above structure, the present invention includes auxiliary link members 100 and 110 to link the rotation of the link member 10 against the base member 130 with the rotation of the monitor main body 120.

The auxiliary link members 100 and 110 are bar-shaped, and are combined to the first and second link supporting parts 42 and 93, respectively, in parallel. In each of the first and second link supporting parts 42 and 93 are provided auxiliary link accommodating parts 42c and 93d, respectively, and a plurality of pin holes 42b and 93b spaced from each other at a predetermined distance. The pin holes 42b and 93b correspond to the auxiliary link accommodating parts 42c and 93d, respectively. On opposite ends of the auxiliary link members 100 and 110 through holes 100a and 110a are positioned to correspond to the pin holes 42b and 93b, respectively.

Thus, in a state that both ends of the auxiliary link members 100 and 110 are inserted into the first and second link supporting parts 42 and 93, and the through holes 100a and 110a positioned on both ends of the auxiliary link members 100 and 110 respectively correspond to the pin holes 42b and 93b positioned on the first and second link supporting parts 42 and 93, the auxiliary link members 100 and 110 are coupled to the first and second link supporting parts 42 and 93, respectively, by a plurality of link coupling pins 102. Therefore, the pair of auxiliary link members 100 and 110 move in parallel with each other.

Operation of each part of the monitor according to the present invention will be described below.

Figure 7A:
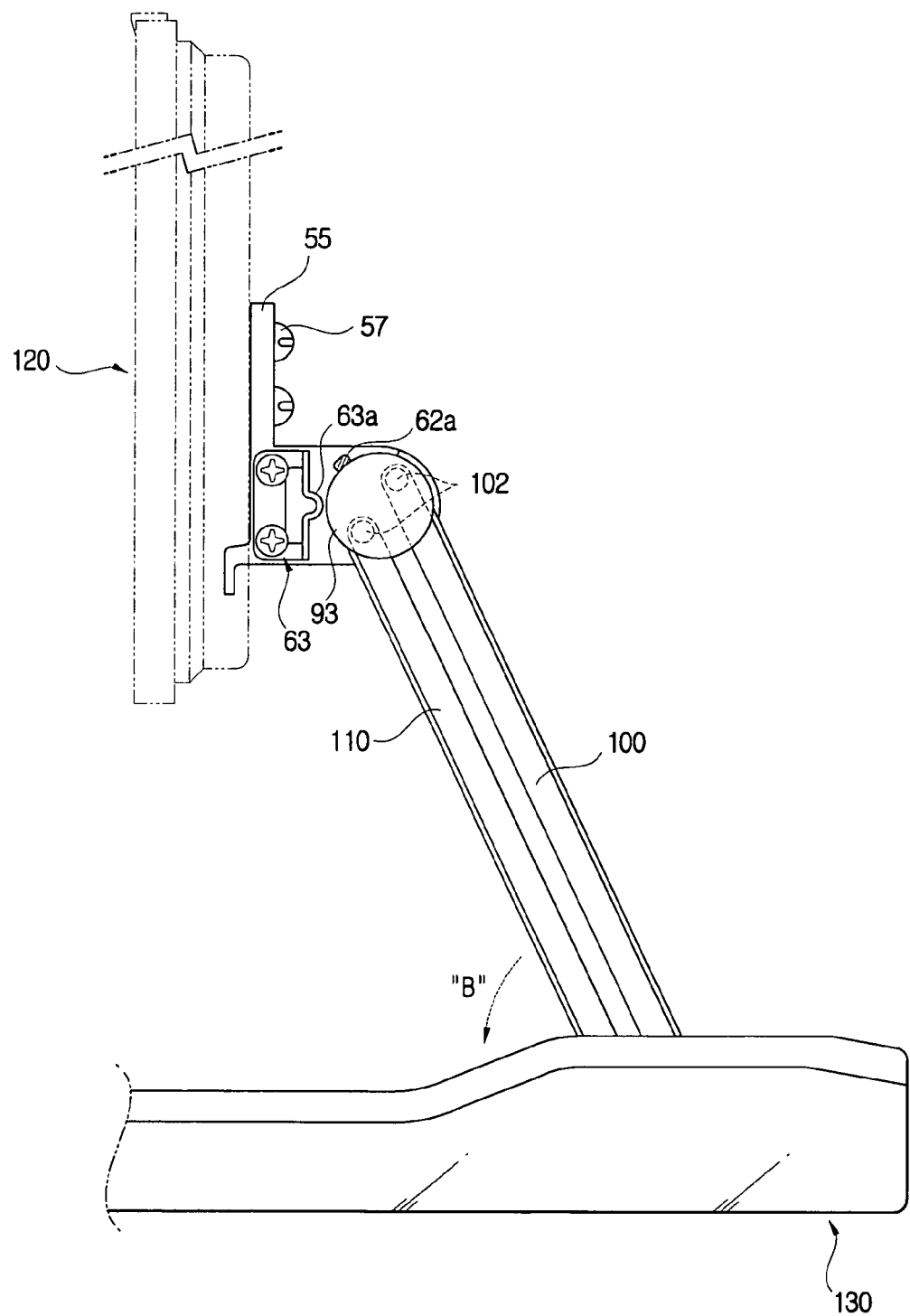
FIGS. 7A through 7D are partially enlarged side views of the monitor according to an operating state thereof.

As shown in FIGS. 7A through 7D, the link member 10 is downwardly pressed along an arrow "B" in FIG. 7A. Then, the link member 10 is downwardly rotated on the first and second hinge pins 33 and 44 (see FIGS. 7B and 8B). Here, the link member 10 is slowly rotated because of the elasticity of the torsion spring 35 put on the first base hinge part 30.

Figure 7B:
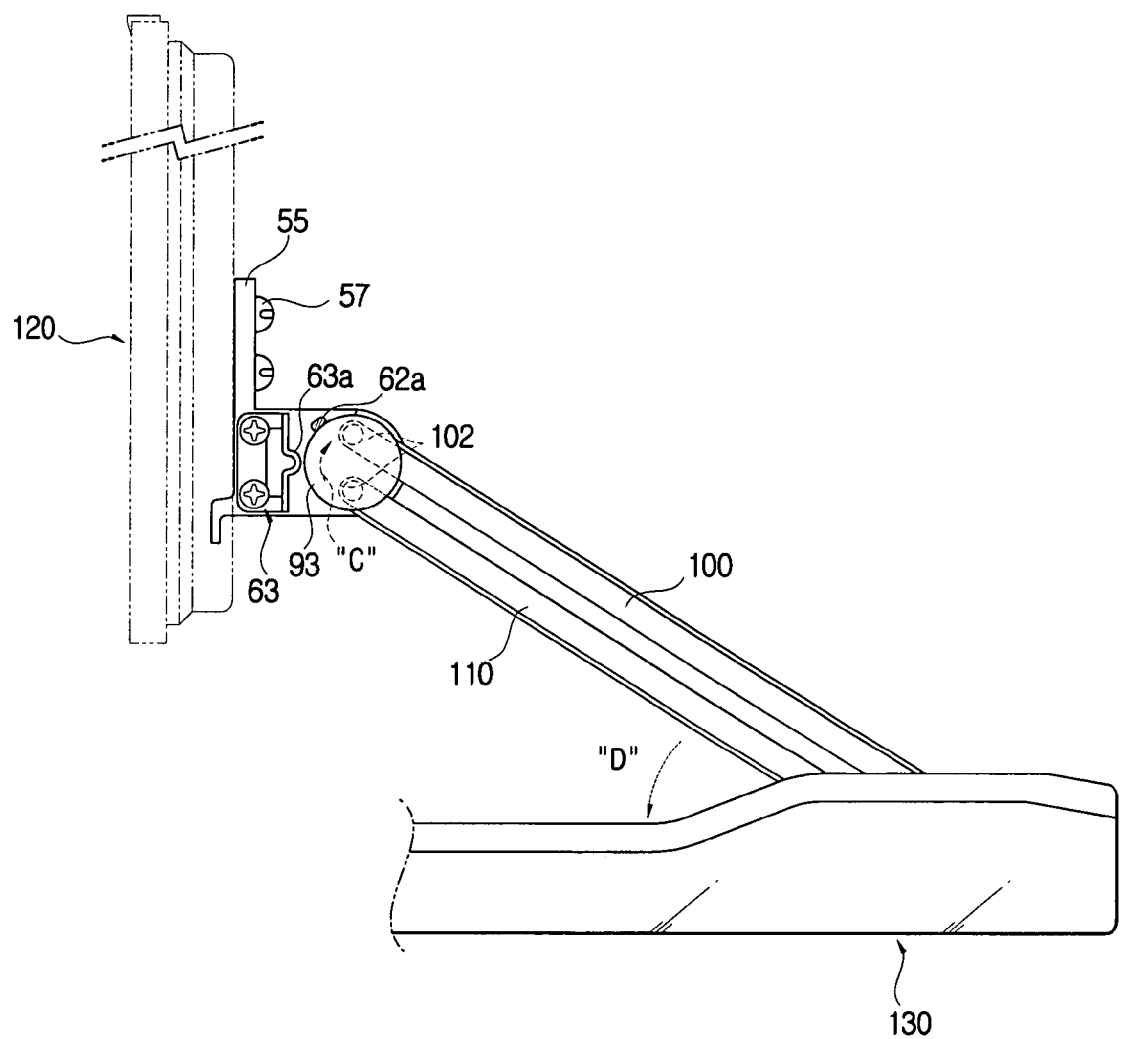

According to the downward-rotation of the link member 10, the second link supporting part 93 provided at the upper part 10b of the link member 10 is rotated, as shown in FIG. 7B, in a clockwise direction "C" at a predetermined angle by the auxiliary link members 100 and 110. Herein, because the rotation of the second link supporting part 93 is linked with the third hinge pin 94, and the third hinge pin 94 is rotated together with the supporter 55, the monitor main body 120 is tilted at the predetermined angle. Here, the tilting angle of the monitor main body 120 is relatively small. Additionally, the rotation angle of the monitor main body 120 may be adjusted by altering a length and coupling position of the auxiliary link members 100 and 110. In the foregoing description, the reason that the third hinge pin 94 is rotated together with the supporter 55 is that the third hinge pin 94 and the third pin accommodating part 91 of the supporter 55 are rotatably combined by force stronger than the torque due to the weight of the monitor main body 120.

Figure 7C:
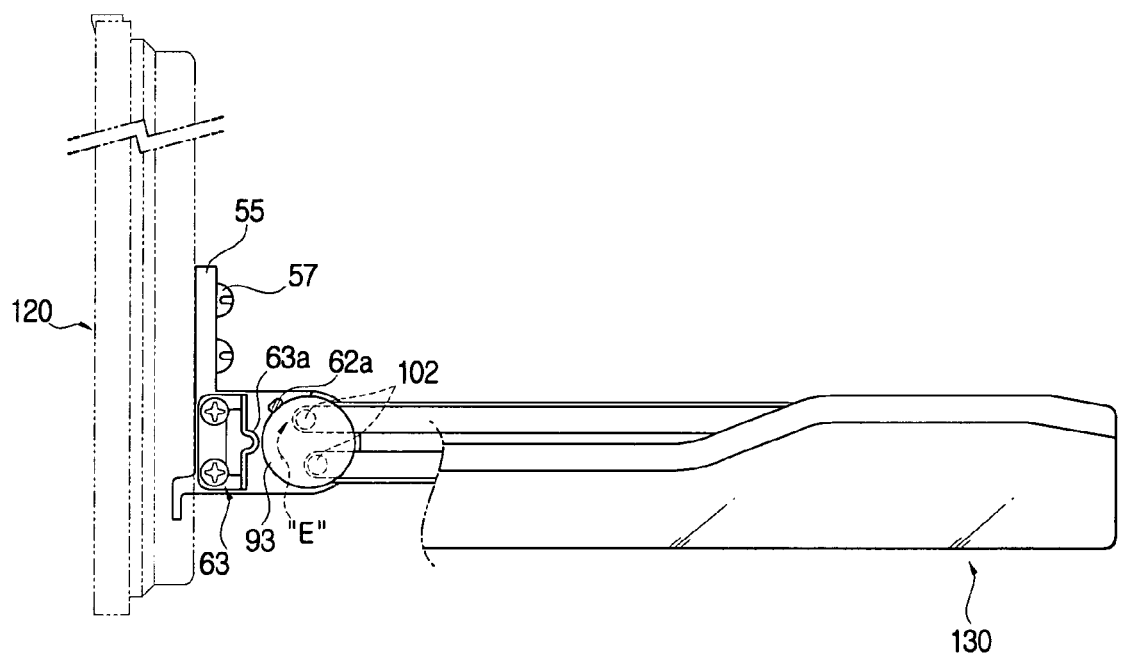

In a state of the monitor as illustrated in FIG. 7B, if the link member 10 is more downwardly pressed along an arrow "D," the link member 10 is slowly rotated because of the elasticity of the torsion spring 35 until the first and second stoppers 51a and 51b provided at the first and second base hinge parts 30 and 40 are engaged with the projections 52a and 52b each formed around the first and second boss accommodating part 32 and 42a (see FIG. 8C). In this state, the link member 10 is not downwardly rotated anymore, as illustrated in FIG. 7C. Here, the second link supporting part 93 is rotated in a clockwise direction "E" beyond the state as illustrated in FIG. 7B.

In the state of the monitor illustrated in FIG. 7C, to fold the monitor main body 120 on the base member 130, the monitor main body 120, which is stopped in the state that the projection 62a of the rotation-restricting washer 62 is engaged with the projection 63a of the flat spring 63 fastened to the supporter 55, should be backwardly pressed against the base member 130 enough to deform the projection 63a of the flat spring 63 elastically. The projection 62a of the rotation-restricting washer 62 is thereby allowed to rotate over the projection 63a of the flat spring 63 and to be engaged with the other side of the third stopper 61. Accordingly, the monitor main body 120 is completely laid on the base member 130 (see FIGS. 7D and 9D).

Figure 7D:
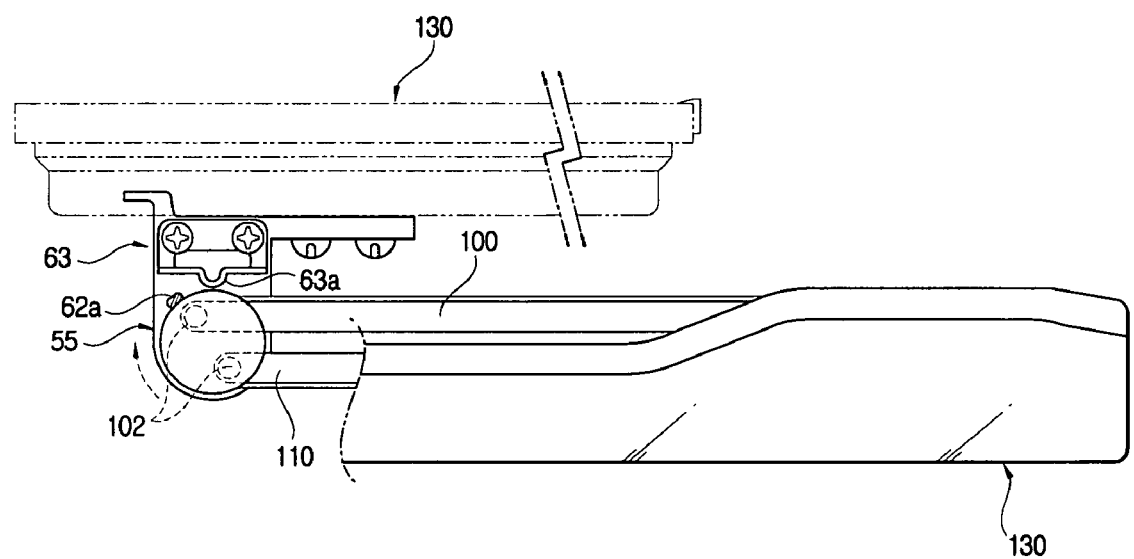

A process of altering the monitor from the state as shown in FIG. 7D (together with FIGS. 8C and 9D) into the state as shown in FIG. 7A is performed in a reverse order to the description as described above.

As described above, because the monitor main body 120 is completely laid on the base member 130, a packing volume of the monitor is decreased, thereby decreasing costs to keep and carry the monitor.

Figure 10:
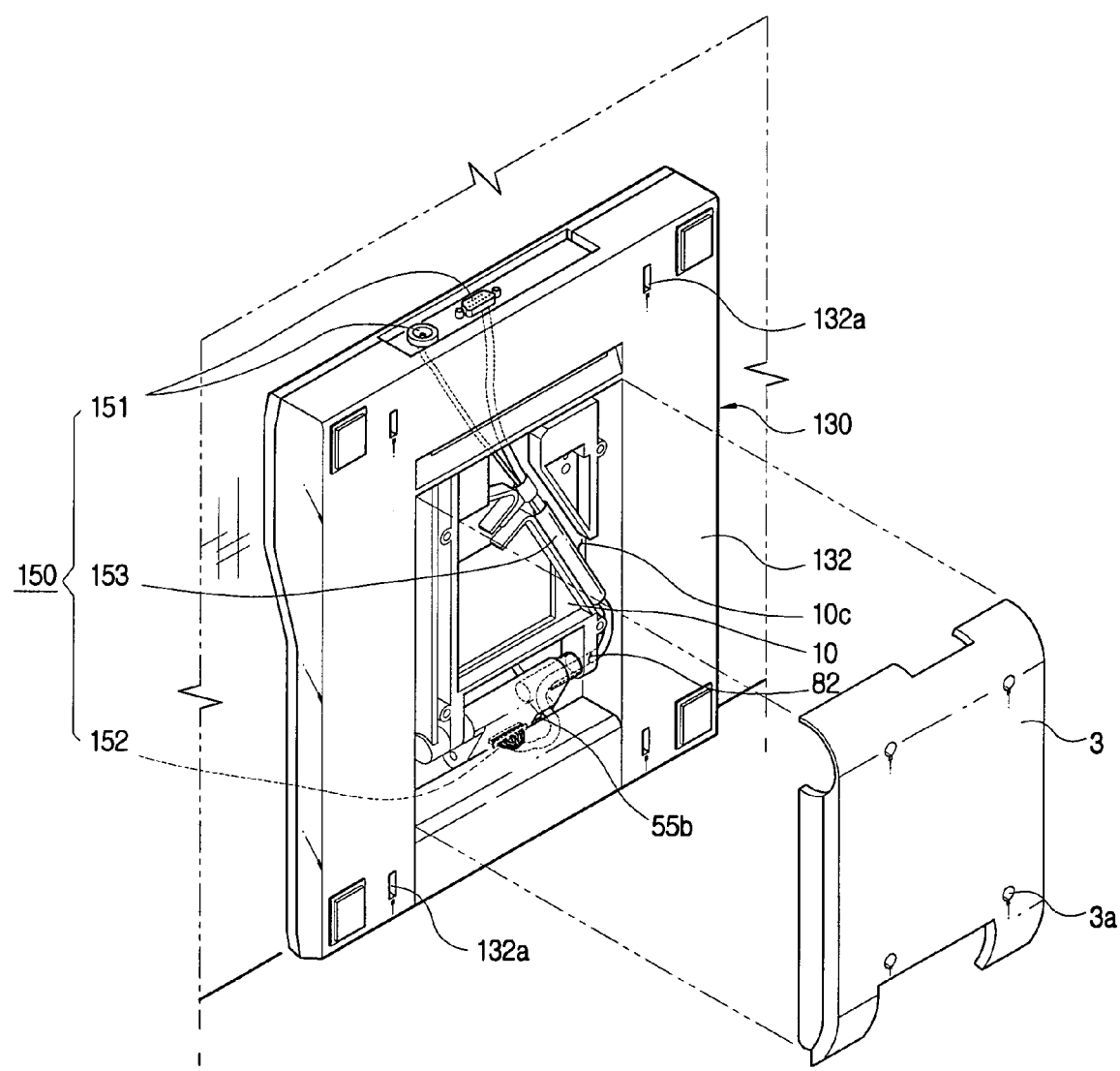
FIG. 10 is a schematic view illustrating cables arranged in a link member of the monitor according to the present invention.

FIG. 10 is a schematic view illustrating cables arranged in the link member 10 of the monitor. As shown therein, on the rear of the link member 10, a cable accommodating part 10c to accommodate the cables 153 of the cable assembly 150 is provided. The first cable ports 151 of the cable assembly 150 are fastened to the port receiving parts 133b provided in the base member 130, and the second cable port 152 thereof is connected to a part of the monitor main body 120. In the first hinge holder 83 of the link member 10 and the first hinge accommodating part 81 of the supporter 55 are provided cable accommodating grooves 55b and 82, respectively, to accommodate and guide the cables 153 (see FIG. 6). Thus, the cables 153 provided between the monitor main body 120 and the base member 130 are attached on the link member 10 to be accommodated in the link assembly 1.

Figure 11A:
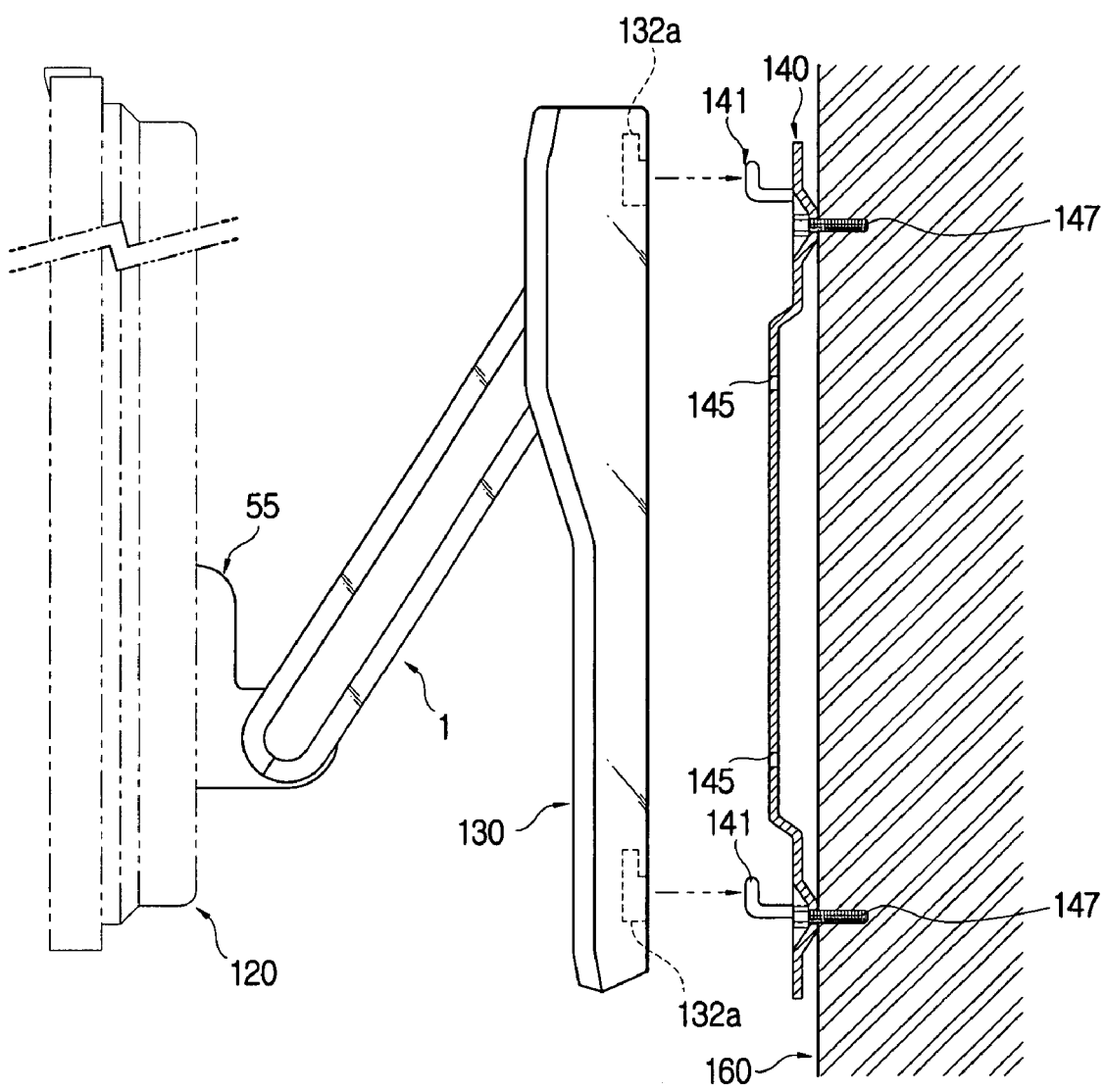
FIGS. 11A and 11B are side views illustrating the monitor being mounted on a wall.
Figure 11B:
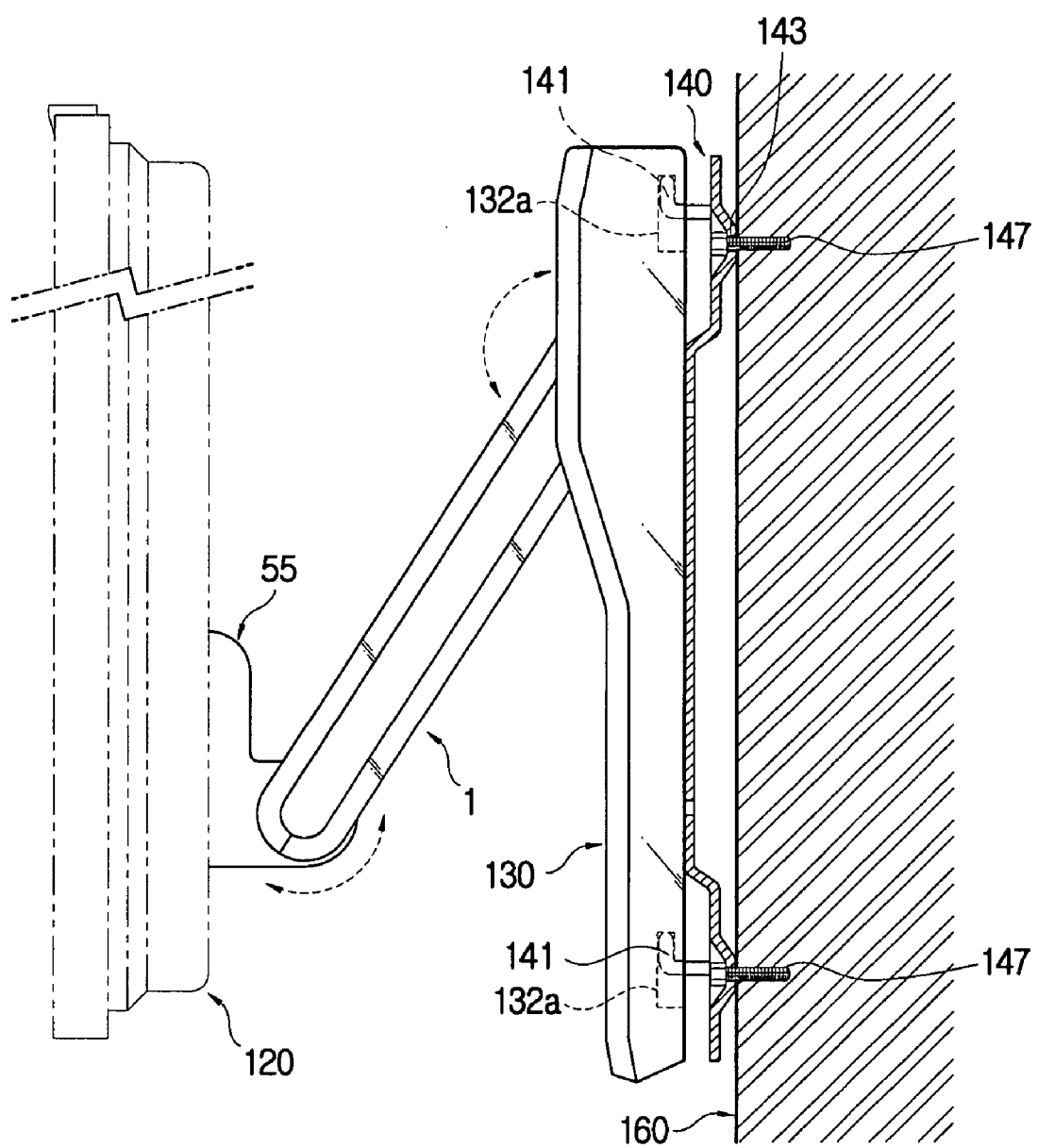

FIGS. 11A and 11B are side views illustrating the monitor being mounted on a wall. As shown therein, the base bracket 140 is fastened to a wall 160 with bolts 147. The hook holders 132a of the base member 130 are hung on the hooks 141 of the base bracket 140. Therefore, the monitor may be detachably mounted on the wall 160.

Figure 12A:
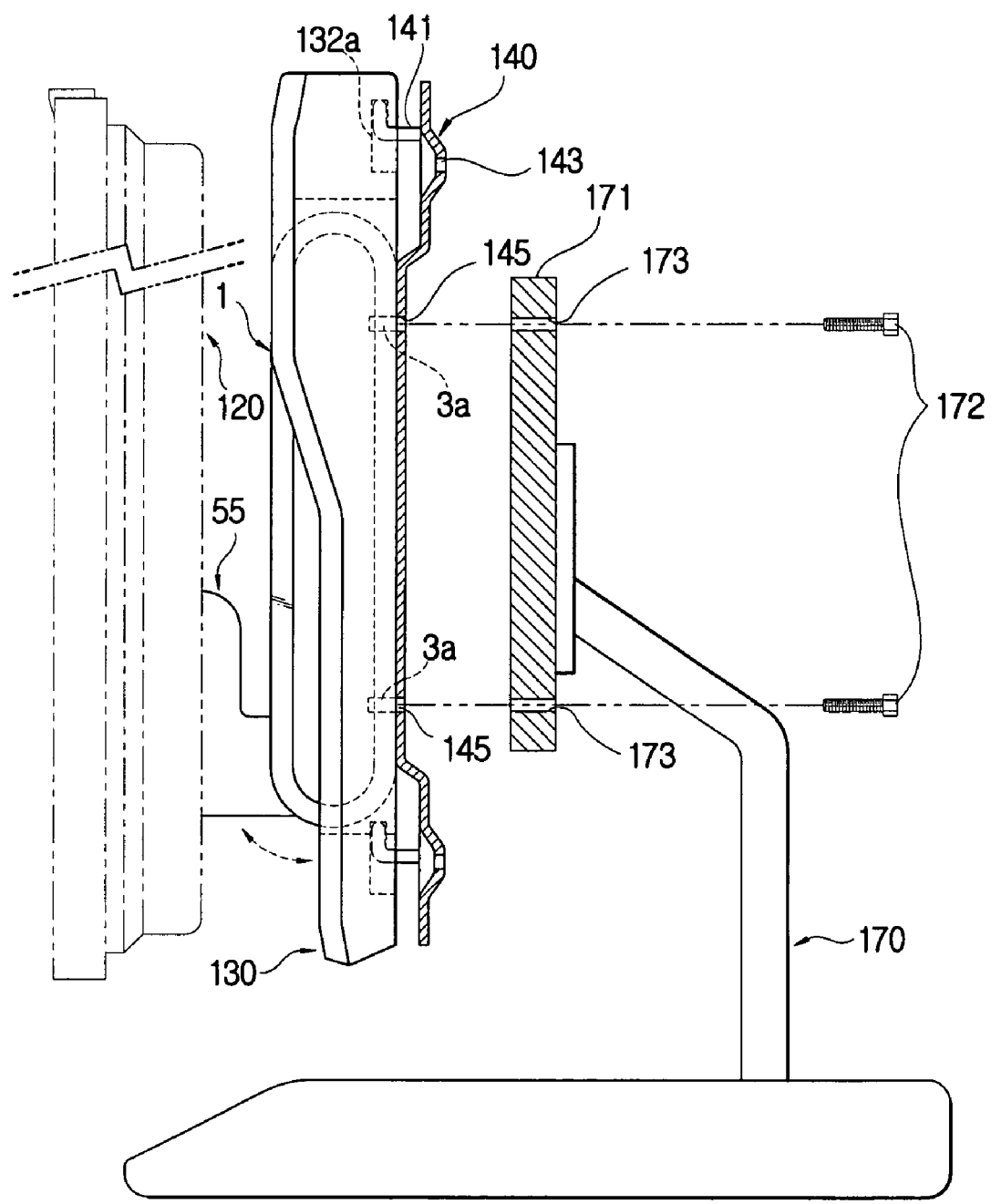
FIGS. 12A and 12B are side views illustrating the monitor being mounted on an arm stand.
Figure 12B:
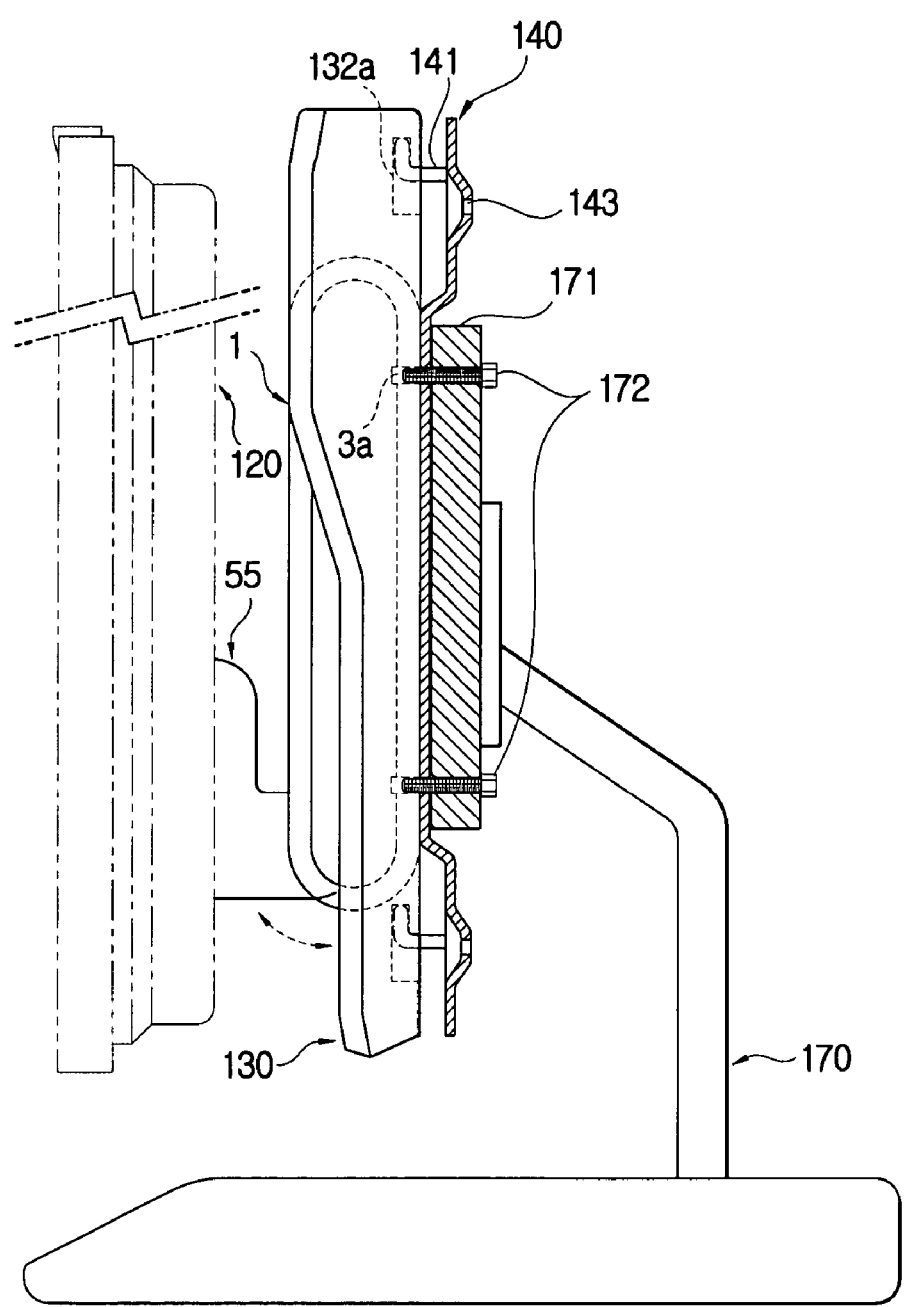

FIGS. 12A and 12B are side views illustrating the monitor being mounted on an arm stand. As shown therein, the hooks 141 of the base bracket 140 are inserted in the hook holders 132a of the base member 130, thereby combining the base bracket 140 and base member 130. Further, a monitor supporting part 171 provided at an upper part of the arm stand 170 is formed with a plurality of bracket combining holes 173 according to VESA. The base member 130 combined with the base bracket 140 is put on the monitor supporting part 171. Thereafter, bolts 172 are combined to the third combining holes 3a formed on the lower link member cover 3 at a rear of the monitor supporting part 171 by passing through the bracket combining holes 173 of the monitor supporting part 171 and the second combining holes 145 of the base bracket 140. Therefore, the monitor may be easily mounted on various arm stands according to the VESA, and both the link member 10 and the base member 130 may be combined to the monitor supporting part 171 of the arm stand 170.

In the foregoing description, the torsion spring 35 allowing for the slow rotation of the link member 10 is provided in the first base hinge part 30. However, the torsion spring 35 may be provided in at least one of the first and second base hinge parts 30 and 40, respectively. Further, the tilt restricting device 50 is provided in the second base hinge part 40. However, the tilt restricting device 50 may be provided in at least one of the first and second base hinge parts 30 and 40, respectively.

Further, the monitor angle restricting device 60 restricting the angle adjustment of the monitor may be provided in the first monitor hinge part 80.

Figure 13A:
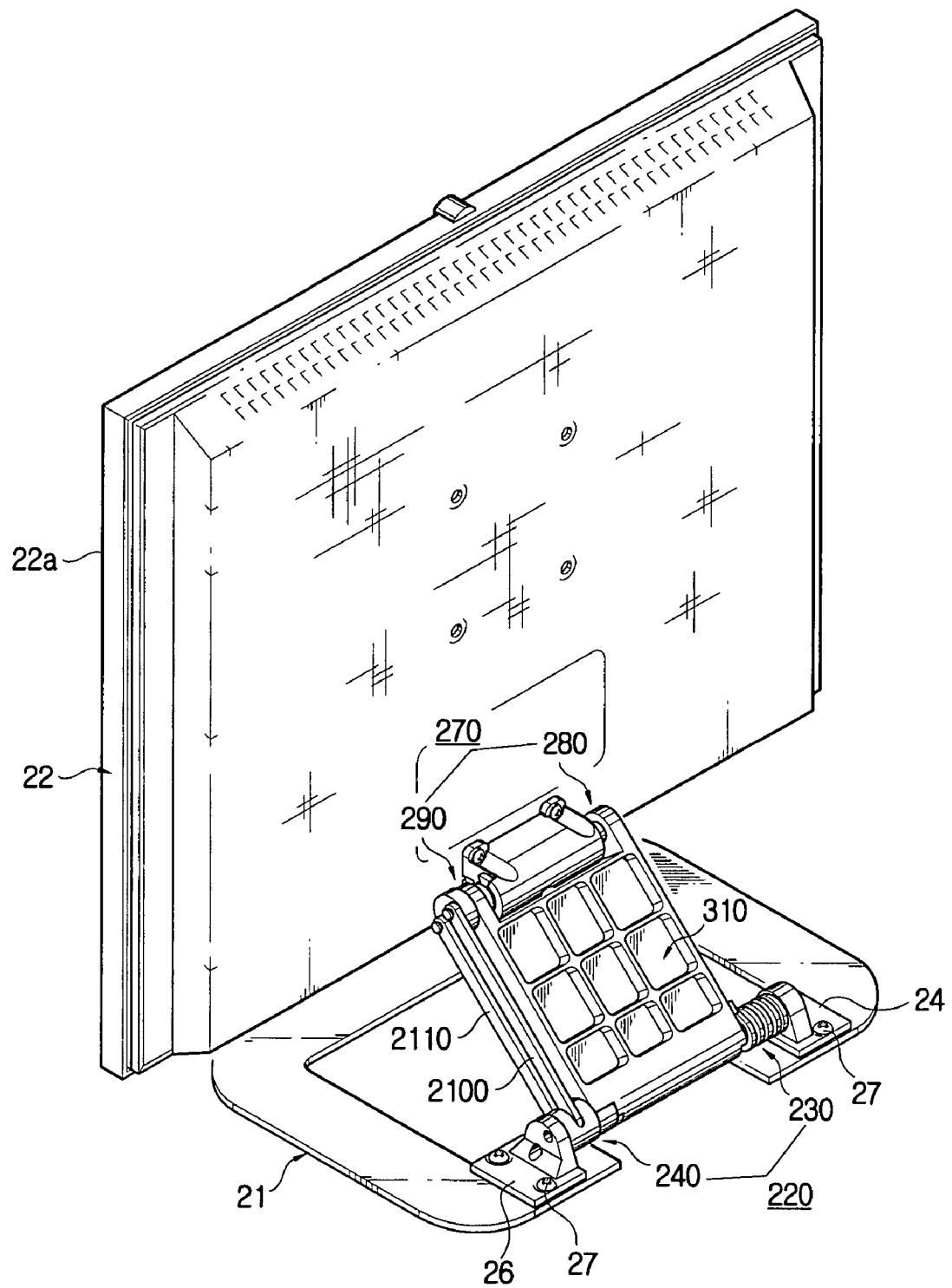
FIG. 13A is a perspective view of a rear of a monitor, according to another embodiment of the present invention.
Figure 13B:
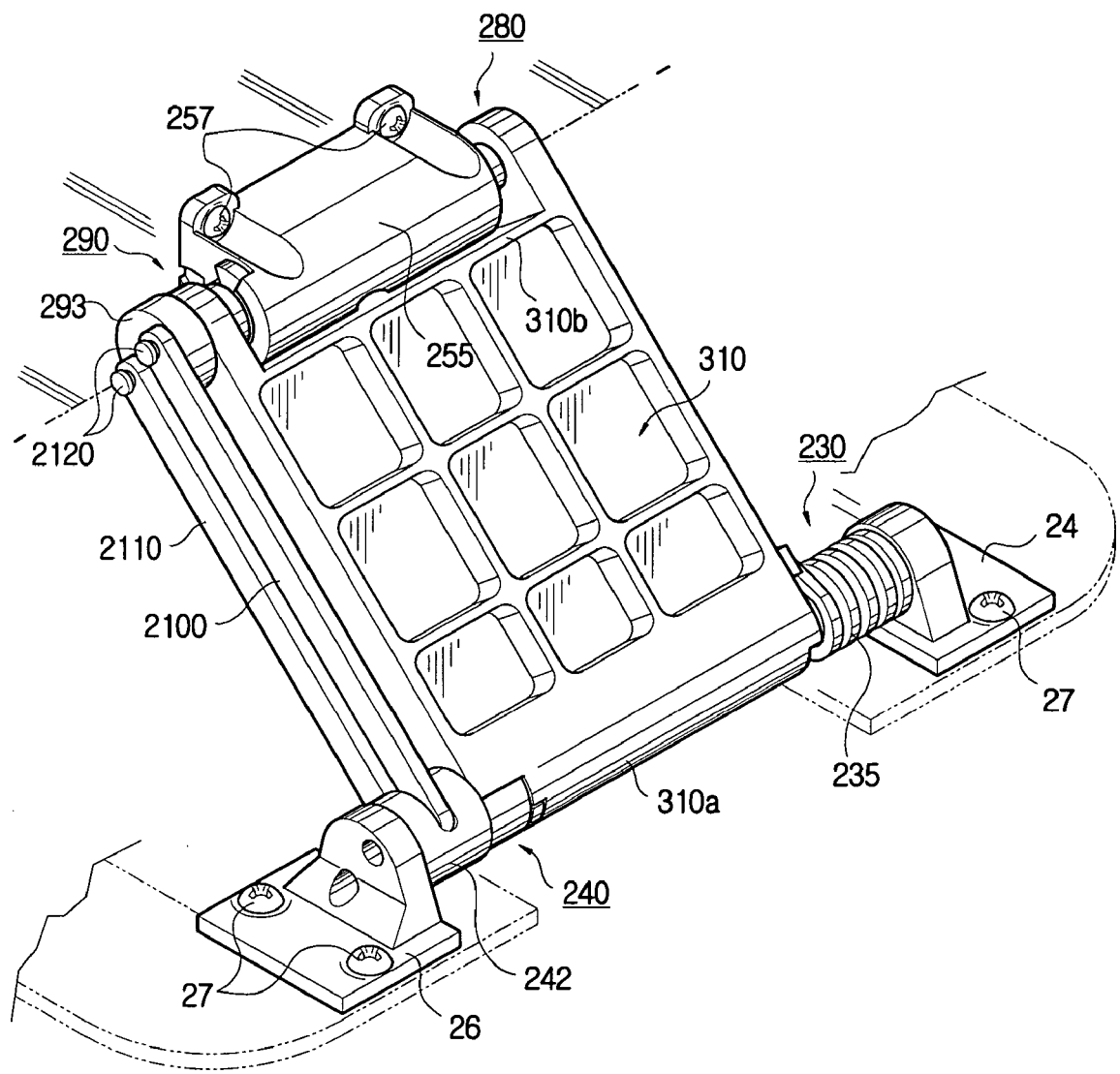
FIG. 13B is a partially enlarged perspective view of a link assembly of the monitor as shown in FIG. 13A.
Figure 13C:
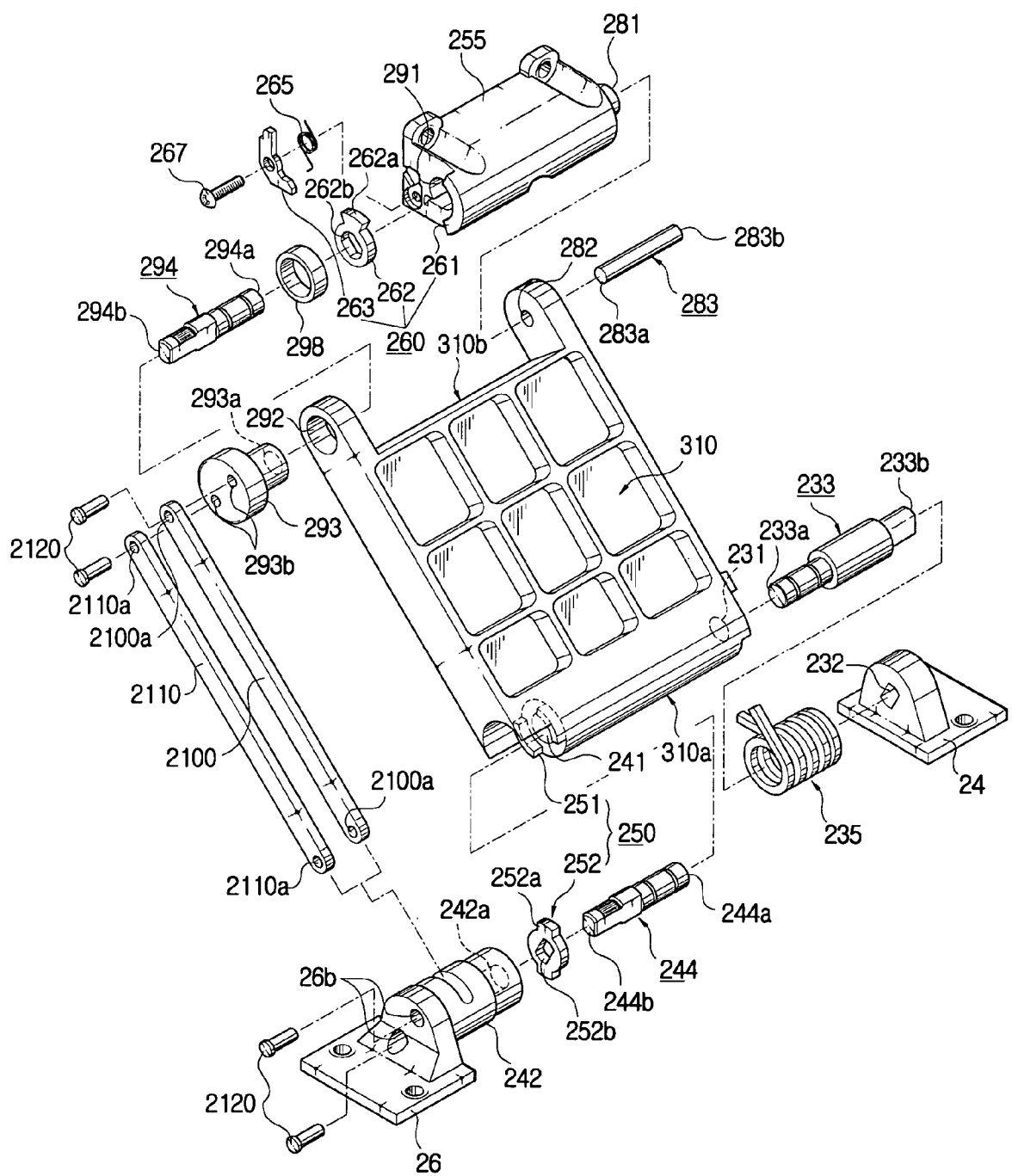
FIG. 13C is an exploded perspective view of the link assembly as shown in FIG. 13B.

FIGS. 13A through 13C show a monitor having a link assembly and a base member, according to another embodiment of the present invention.

As shown in FIGS. 13A through 13C, the monitor includes a base member 21, a main body 22 having a screen 22a to display a picture, a link member 310 linking the base member 21 with the main body 22, a base hinge 220 rotatably connecting a lower part 310a of the link member 310 with the base member 21, and a monitor hinge 270 rotatably connecting an upper part 310b of the link member 310 with the main body 22.

The link member 310 rotates against the base member 21 within a predetermined angle range. The range of the rotation angle is determined based on regulation requirement in various nations, for example, 0° through 65°.

A base hinge 220 is provided between first and second fixing brackets 24 and 26 which are spaced from each other at a predetermined distance and fastened on the base member 21 with bolts 27. The base hinge 220 includes first and second base hinge parts 230 and 240 rotatably connecting both edges of the lower part 310a of the link member 310 with the first and second fixing brackets 24 and 26, respectively.

The first base hinge part 230 (see FIGS. 13B and 13C) includes a first pin accommodating part 231 formed on a right side of the lower part 310a of the link member 310, a boss accommodating part 232 formed on the first fixing bracket 24, and a first hinge pin 233 having first and second ends coupled to the first pin accommodating part 231 and the boss accommodating part 232, respectively.

A first end 233a of the first hinge pin 233 is rotatably inserted into the first pin accommodating part 231 and has a predetermined friction therebetween. A second end 233b of the first hinge pin 233 is nonrotationally fitted into the boss accommodating part 232. Thus, the first end 233a of the first hinge pin 233 and the first pin accommodating part 231 have circular shaped sections. The second end 233b of the hinge pin 233 and the boss accommodating part 232 have noncircular shaped sections. Herein, the friction between the first hinge pin 233 and the first pin accommodating part 231 prevents the link member 310 from being downwardly rotated due to the weight of the main body 22 against the base member 21.

On the first hinge pin 233 a first torsion spring 235 is placed. One end of the first torsion spring 235 is positioned at the right side of the lower part 310a of the link member 310 on which the first pin accommodating part 231 is formed, and the other end thereof is positioned at the first fixing bracket 24.

The first torsion spring 235 provides elasticity acting in an opposite direction to a downward rotation of the link member 30 against the base member 21. The first torsion spring 235 provides elasticity approximately equal to torque due to the weight of the main body 22 in the base hinge 220. Further, because there is the friction between the first hinge pin 233 and the first hinge accommodating part 231 provided in the first base hinge part 230, and a friction between a second hinge pin 244 and a second hinge accommodating part 241 (to be described later) provided in the second base hinge part 240, the link member 310 is stopped in the upwardly or downwardly rotated state. Therefore, in order to rotate the link member 310 upwardly or downwardly against the base member 21, the link member 310 is pressed by a force stronger than the friction of the first and second base hinge parts 230 and 240.

The second base hinge part 240 (see FIGS. 13B and 13C) includes the second pin accommodating part 241 formed on a left side of the lower part 310a of the link member 310, a first link supporting part 242 combined to the second fixing bracket 26 and formed with a spline accommodating part 242a therein, and the second hinge pin 244 having first and second ends coupled to the second pin accommodating part 241 and the spline accommodating part 242a, respectively.

The first end 244a of the second hinge pin 244 has a circular shaped section and is rotatably inserted into the second pin accommodating part 241 and has a predetermined friction therebetween. The second end 244b of the second hinge pin 244 is nonrotationally fitted into the spline accommodating part 242a. Here, the second end 244b of the second hinge pin 244 is splined so as to be matched to the spline accommodating part 242a of the first link supporting part 242. Herein, the friction between the second hinge pin 244 and the second pin accommodating part 241 prevents the link member 310 from being downwardly rotated due to the weight of the main body 22 against the base member 21.

Corresponding to the first torsion spring 235 provided in the first base hinge part 230 to keep the link member 310 in place, on the second base hinge part 240 is placed a rotation-angle restricting device 250 to restrict a rotation of the link member 310 against the base member 21 within a predetermined range. The rotation-angle restricting means 250 is designed to be fit for rotation angle regulations according to VESA.

The rotation-angle restricting device 250 (see FIGS. 13C and 18A) includes a pair of first stoppers 251 formed at the left side of the lower part 310a of the link member 310 around the second pin accommodating part 241 to face each other. The rotation-angle restricting device 250 also includes a first rotation-restricting washer 252 placed on the second hinge pin 244 including a pair of projections 252a to be selectively engaged with the first stoppers 251 according to a rotation direction of the link member 310.

On the first rotation-restricting washer 252 is formed a noncircular-shaped through hole 252b. Thus, into the through hole 252b of the first rotation-restricting washer 252 is inserted the second hinge pin 244. Therefore, if the link member 310 is downwardly pressed against the base member 21, the link member 310, rotatably combined to the first and second hinge pins 233 and 244, is downwardly rotated until the first stoppers 251 are engaged with the projections 252a of the first rotation-restricting washer 252 at a downward rotation limit position (see FIG. 18C).

Figure 18A:
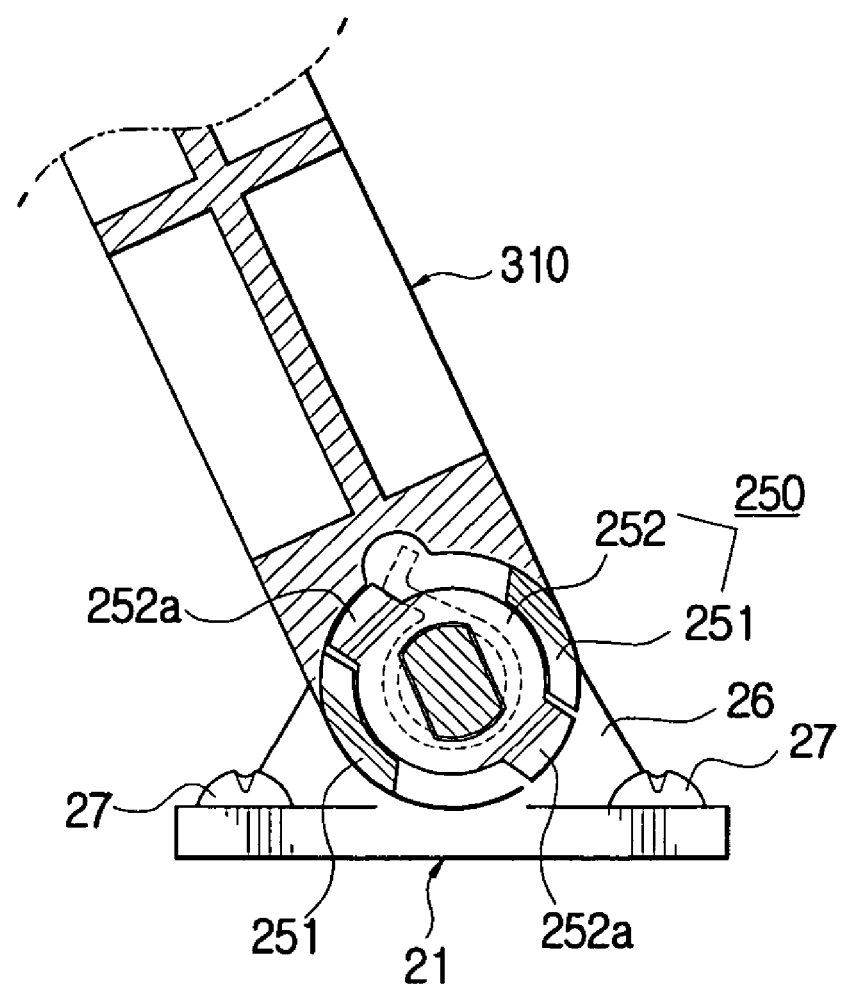
FIGS. 18A through 18C are partially enlarged sectional views illustrating a base hinge part according to the operating state of the monitor corresponding to FIGS. 14 through 17.

To the contrary, if the link member 310 is upwardly pressed from the base member 21, the link member 310 is upwardly rotated by the first and second hinge pins 233 and 244 until the first stoppers 251 are engaged with the projections 252a of the first rotation-restricting washer 252 at an upward-rotation limit position (see FIG. 18A).

Thus, the rotation angle of the link member 310 against the base member 21 may be determined by the rotation-angle restricting device 250. Therefore, if the rotation angle of the link member 310 is different in various nations, the rotation angle of the link member 310 may be properly designed as necessary by altering sizes of the projections 252a and the first stoppers 251.

At an upper part 310b of the link member 310 is provided a monitor hinge 270 (see FIG. 13A) by which the monitor main body 22 is rotated against the link member 310 within a predetermined angle range. The range of the rotation angle may be properly determined based on regulation requirements in various nations, for example, −5° through 30°.

The monitor hinge 270 includes first and second monitor hinge parts 280 and 290 rotatably combined to opposite edges of a supporter 255 fastened to the main body 22 with bolts 257.

The first monitor hinge part 280 (see FIGS. 13B and 13C) includes a third pin accommodating part 281 formed on a right side of the supporter 255, a fourth pin accommodating part 282 formed at a right side of the upper part 310b of the link member 310, and a third hinge pin 283 to be inserted in the third and fourth pin accommodating parts 281 and 282. Herein, a first end 283a of the third hinge pin 283 is rotatably inserted in the third pin accommodating part 281 to allow the main body 22 to rotate. A second end 283b of the third hinge pin 283 is fixedly press-fitted in the fourth pin accommodating part 282.

The second monitor hinge part 290 (see FIGS. 13B and 13C) includes a fifth pin accommodating part 291 formed on a left side of the supporter 255, a sixth pin accommodating part 292 formed at a left side of the upper part 310b of the link member 310, a second link supporting part 293 rotatably inserted in the sixth pin accommodating part 92 from an outside of the upper part 310b of the link member 310 and formed with a spline accommodating part 293a. The second monitor hinge part 290 also includes a fourth hinge pin 294 having a first end 294a inserted in the fifth pin accommodating part 291 of the supporter 255 and a second end 294b matched to the spline accommodating part 293a of the second link supporting part 293.

Like the first, second and third hinge pins 233, 244 and 283, the first end 294a of the fourth hinge pin 294 is rotatably inserted in the fifth pin accommodating part 291 formed on the supporter 255, having a predetermined friction therebetween. The second end 294b of the fourth hinge pin 294 is nonrotationally matched to the spline accommodating part 293a of the second link supporting part 293. Further, the second link supporting part 293 combined with the second end 294b of the fourth hinge pin 294 is also rotatably inserted in the sixth pin accommodating part 292. A hinge combination between the second link supporting part 293 and the sixth pin accommodating part 292 is interlocked with auxiliary link members 2100 and 2110 (to be described later). Herein, a friction between the fourth hinge pin 294 and the main body 22 prevents the link member 310 from being downwardly rotated due to weight of the main body 22 against the base member 21. Therefore, the friction should be stronger than the torque due to the weight of the main body 22.

In the second monitor hinge part 290, as in the rotation-angle restricting device 250 restricting the rotation of the link member 310 against the base member 21 within the predetermined angle range, a monitor angle restricting device 260 is provided to restrict the rotation of the main body 22 against the link member 310 within a predetermined angle range. The monitor angle restricting device 620 is designed to be fit for the rotatable angle of the main body 22 against the link member 310.

The monitor angle restricting device 260 (see FIG. 13C) includes an arc-shaped second stopper 261 protruding from the left side of the supporter 255 adjacent to the fifth pin accommodating part 291, a second rotation-restricting washer 262 placed on the fourth hinge pin 294 and having a projection 262a to be engaged with the second stopper 261 according to the rotation direction of the main body 22, and a third stopper 263 combined to the left side of the supporter 55 and locked on and released from the projection 262a.

On the second rotation-restricting washer 262 is formed a noncircular-shaped through hole 262b. The through hole 262b of the second rotation-restricting washer 262 is fixedly matched to the fourth hinged pin 294, and therefore the second rotation-restricting washer 262 is rotated together with the fourth hinge pin 294.

The third stopper 263 is rotatably coupled to the left side of the supporting part with a bolt 267 adjacent to the fifth pin accommodating part 291. The third stopper 263 is employed to adjust an angle of the main body 22 while the monitor is used, and to fold the main body 22 on the base member 21 when the monitor is packed.

Between the left side of the supporter 255 and the third stopper 263 a second torsion spring 265 is provided. The second torsion spring 265 (to be described later in more detail) is employed to restore the third stopper 263 to an original position.

Between the second link supporting part 293 and the second rotation-restricting washer 262 a spacer 298 is provided. The spacer 298 is employed to keep a space between the second link supporting part 293 and the second rotation-restricting washer 262 at a predetermined distance.

Figure 19A:
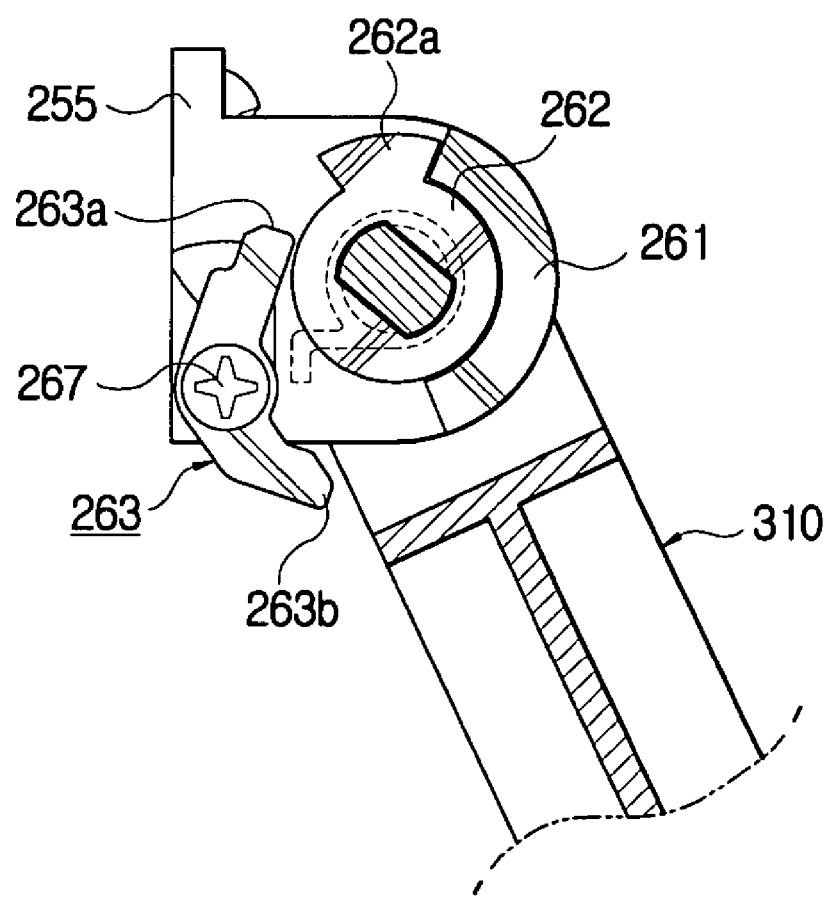
FIGS. 19A through 19D are partially enlarged sectional views illustrating a monitor hinge part according to the operating state of the monitor corresponding to FIGS. 14 through 17.
Figure 19B:
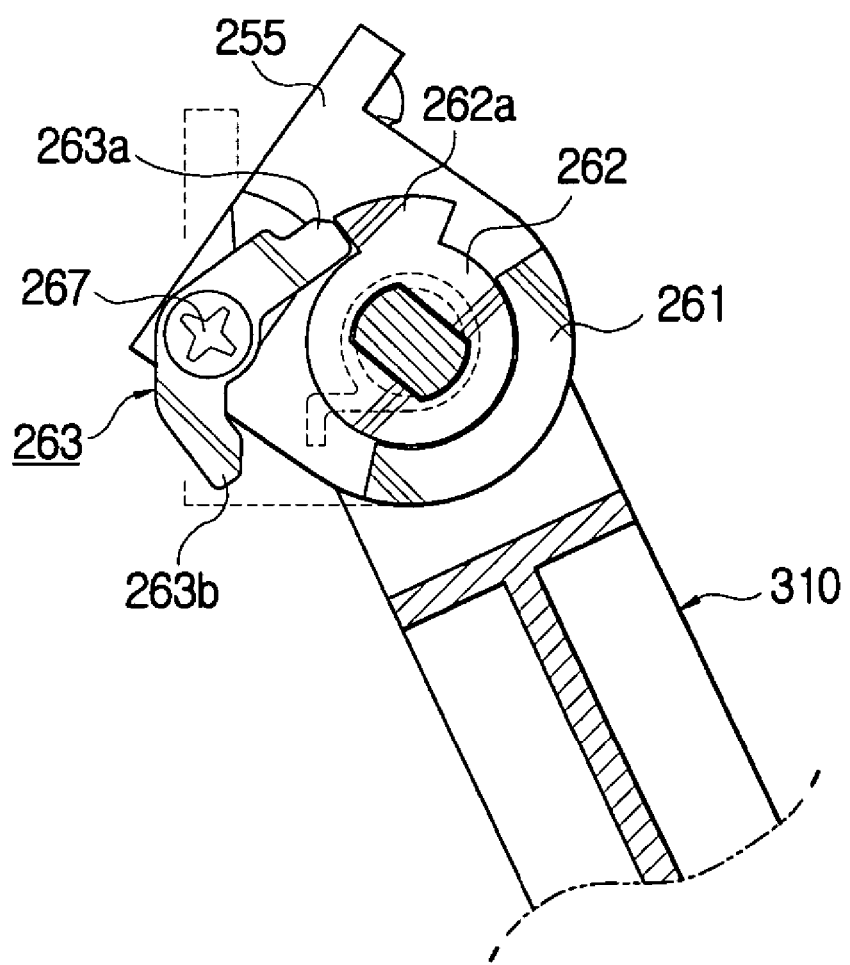

Thus, if the main body 22 is vertically pressed against the link member 310 enough to overcome the friction between the fourth hinge pin 294 and the supporter 255, the main body 22 is rotated on the third and fourth hinge pins 283 and 294, respectively. The main body 22 may be rotated until the projection 262a of the second rotation-restricting washer 262 is engaged with one side of the second stopper 261 or a first end 263a of the third stopper 263 (see FIG. 19A or 19B). Therefore, if an allowable rotation angle of the main body 22 is different in various nations, the rotation angle of the main body 22 may be properly designed as necessary by altering sizes of the projection 262a and the second stopper 261 and by altering a position of the third stopper 263.

Figure 19C:
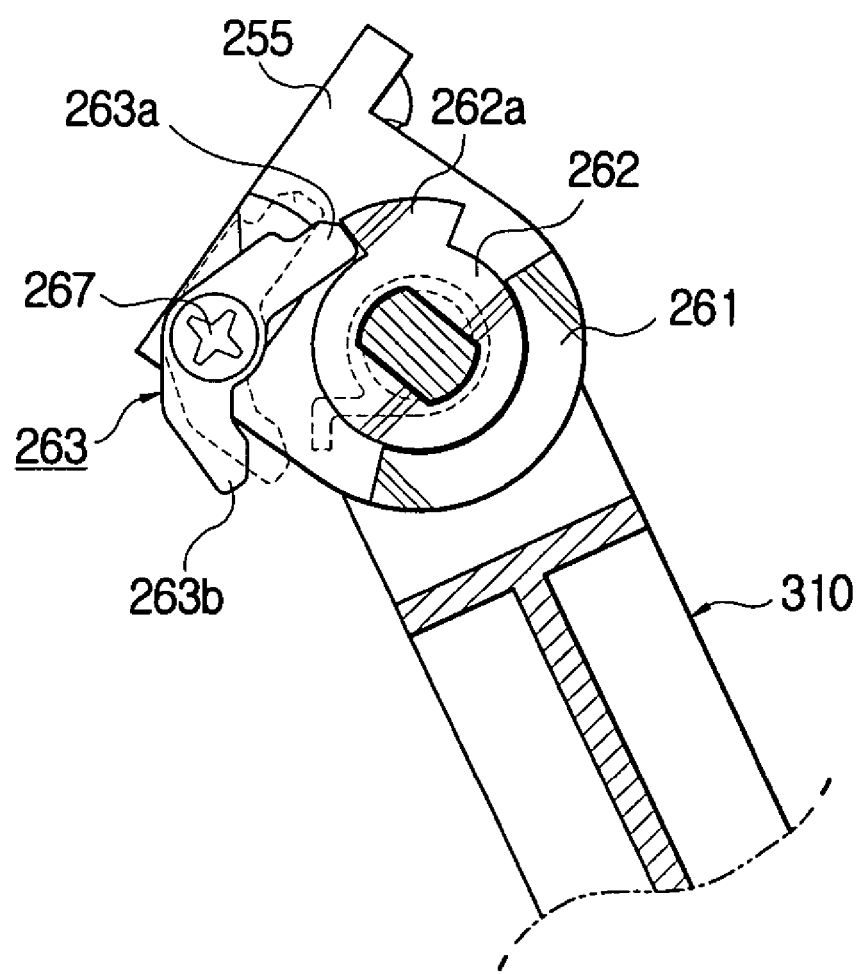
Figure 19D:
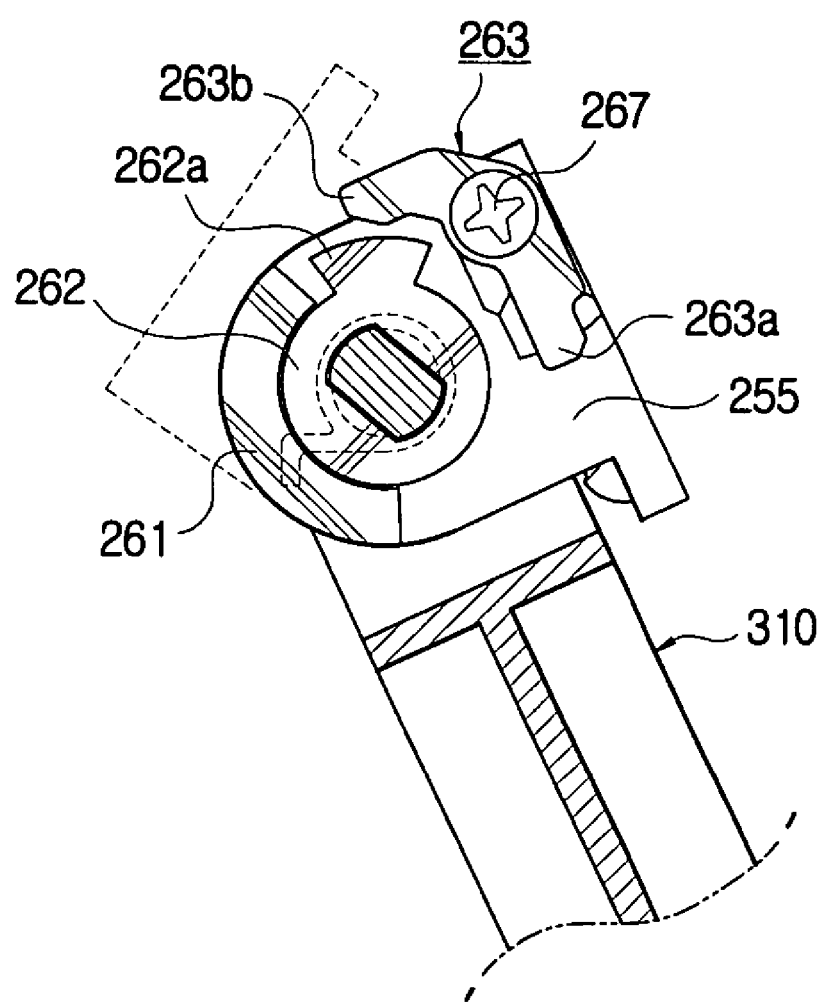

Further, to fold the main body 22 to the base member 21 in a parallel position, the main body 22 is rotated until the projection 262a is engaged with the other side of the second stopper 261 (see FIG. 19D) without being engaged with the first end 263a of the third stopper 263 (see the dotted line on FIG. 19C).

To restore the third stopper 263 to an original position, the second torsion spring is provided in the third stopper 263. Thus, after the projection 262a passes the third stopper 263 while the third stopper 263 is rotated on the bolt 267 by pushing a second end 263b thereof (see the rotation from the solid line to the dotted line in FIG. 19C), if the second end 263b of the third stopper 263 is released by pushing, the third stopper 263 is restored to the original position by the elasticity of the second torsion spring 265.

With the configuration described above, the link member 310 rotates against the base member 21 at a predetermined angle, and the main body 22 rotates against the link member 310 at a predetermined angle.

Further, the link member 310 and the main body 22 may not be individually rotated. That is, the main body 22 may be rotated at the predetermined angle by gearing with the rotation of the link member 310 against the base member 21.

To accomplish this structure, the present invention further includes the auxiliary link members 2100 and 2110 to link the rotation of the link member 310 against the base member 21 with the rotation of the main body 22.

The auxiliary link members 2100 and 2110 are bar-shaped, and are combined to the first and second link supporting parts 242 and 293, respectively, in parallel. In each of the first and second link supporting parts 242 and 293, are provided a plurality of pin holes spaced from each other at a predetermined distance. The second link supporting part 293 is provided with pin holes 293b. Particularly, pin holes (not shown) of the first link supporting part 242 correspond to pin holes 26b formed on the second fixing bracket 26. On both ends of the auxiliary link members 2100 and 2110 are formed through holes 2100a and 2110a to correspond to the pin holes 293b and 26b, respectively.

Thus, in a state that the through holes 2100a and 2110a formed on both ends of the auxiliary link member 2100 and 2110 respectively correspond to the pin holes formed on the first and second link supporting parts 242 and 293 and the pin holes 26b formed on the second fixing bracket 26, the auxiliary link member 2100 and 2110 are coupled to the first and second link supporting parts 242 and 293, respectively, by a plurality of link fixing pins 2120. Therefore, the pair of auxiliary link member 2100 and 2110 move in parallel with each other.

An operation of the monitor according to the present invention will be described hereinbelow.

Figure 14:
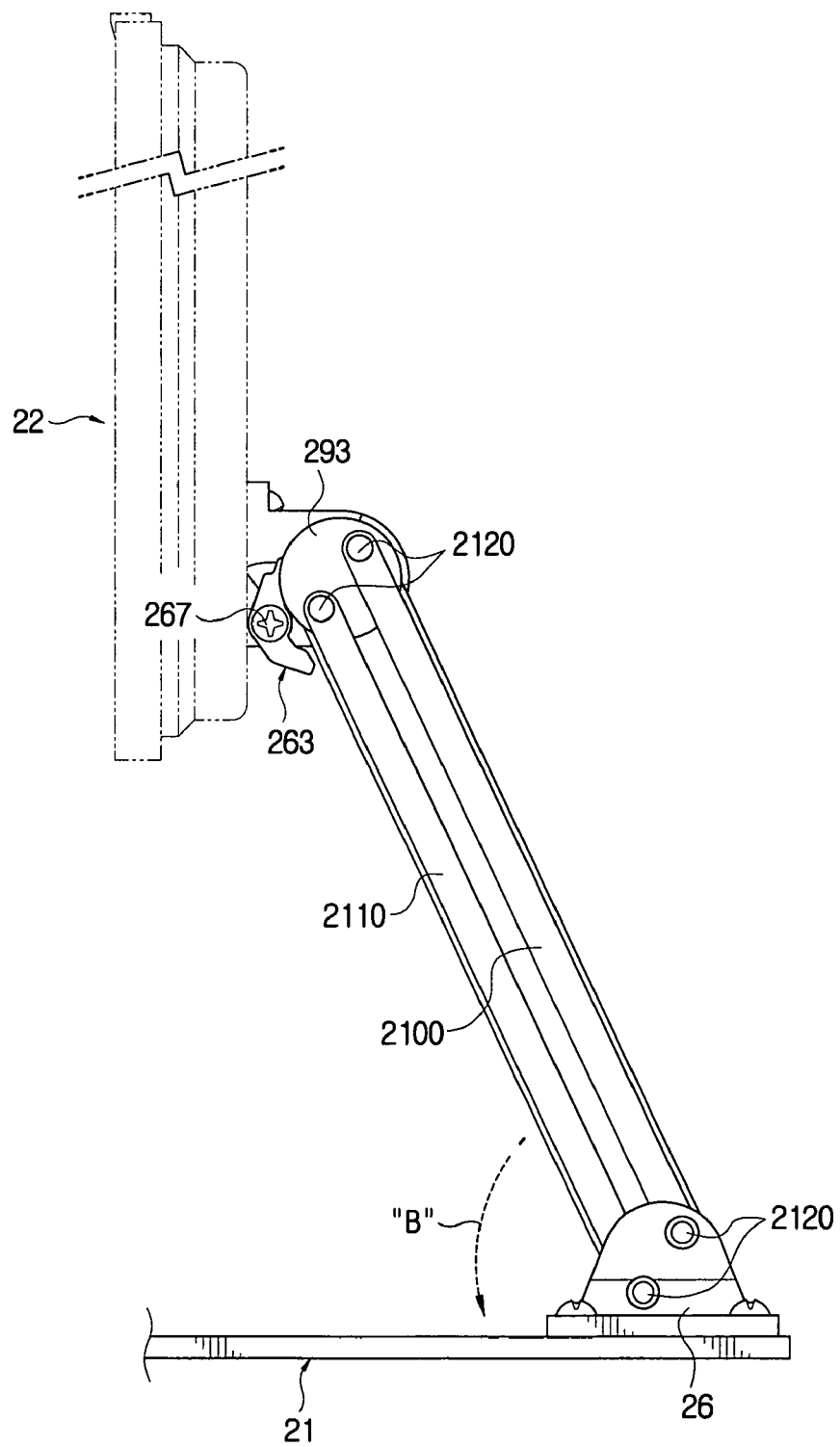
FIGS. 14 through 17 are partially enlarged side views illustrating an operating state of the monitor as shown in FIG. 13A.
Figure 18B:
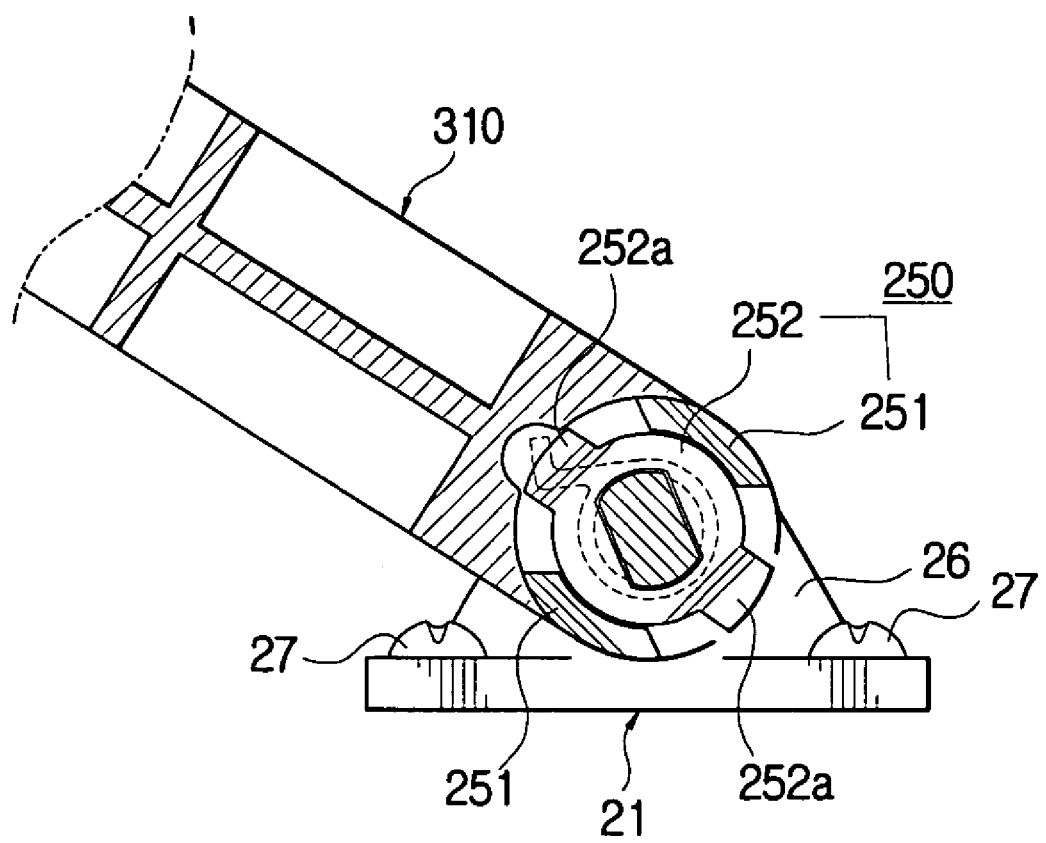

In a state of the monitor illustrated in FIG. 14 (together with FIGS. 18A and 9A), the link member 310 is downwardly pressed along an arrow "B" in FIG. 14. Then, the link member 310 is downwardly rotated on the first and second hinge pins 233 and 244 (see FIGS. 15 and 18B). The link member 310 is slowly rotated because of the elasticity of the first torsion spring 235 placed on the first base hinge part 230.

Figure 15:
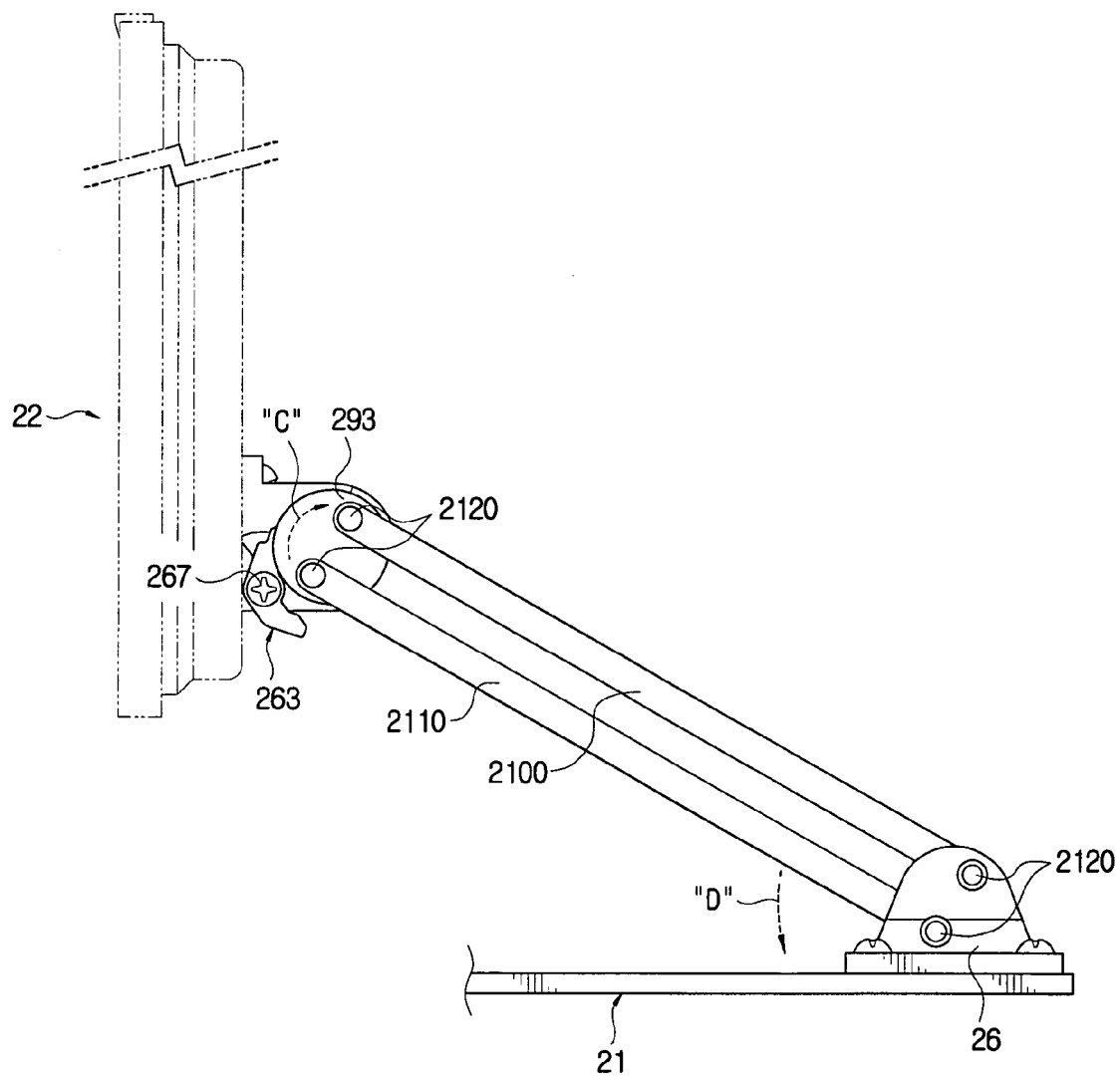

According to the downward rotation of the link member 310, the second link supporting part 293 provided at the upper part 310b of the link member 310 is rotated, as shown in FIG. 15, in a clockwise direction "C" at a predetermined angle by the auxiliary link members 2100 and 2110. Herein, the rotation of the second link supporting part 293 rotates the third hinge pin 283 and the fourth hinge pin 294 and the supporter 255 are interlocked by the friction therebetween, so that the main body 22 is also rotated at the predetermined angle. The rotation angle of the main body 22 is comparatively small. Additionally, the rotation angle of the main body 22 may be adjusted by altering a length and a coupling position of the auxiliary link members 2100 and 2110.

Figure 16:
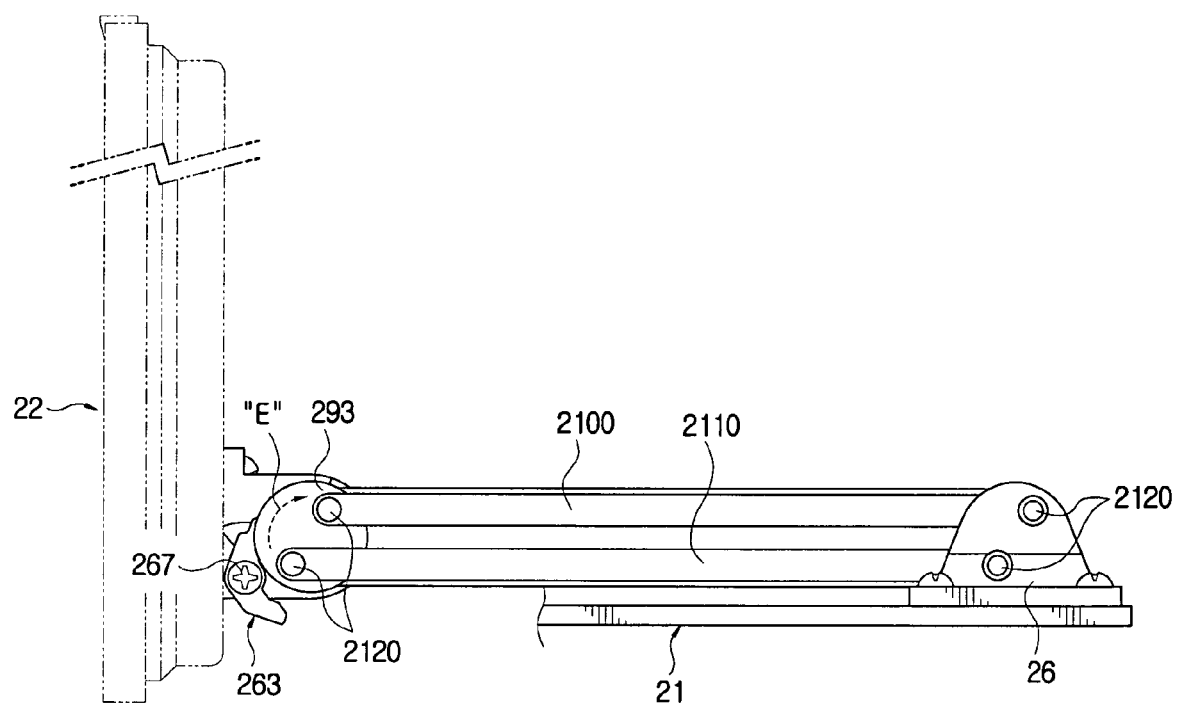
Figure 18C:
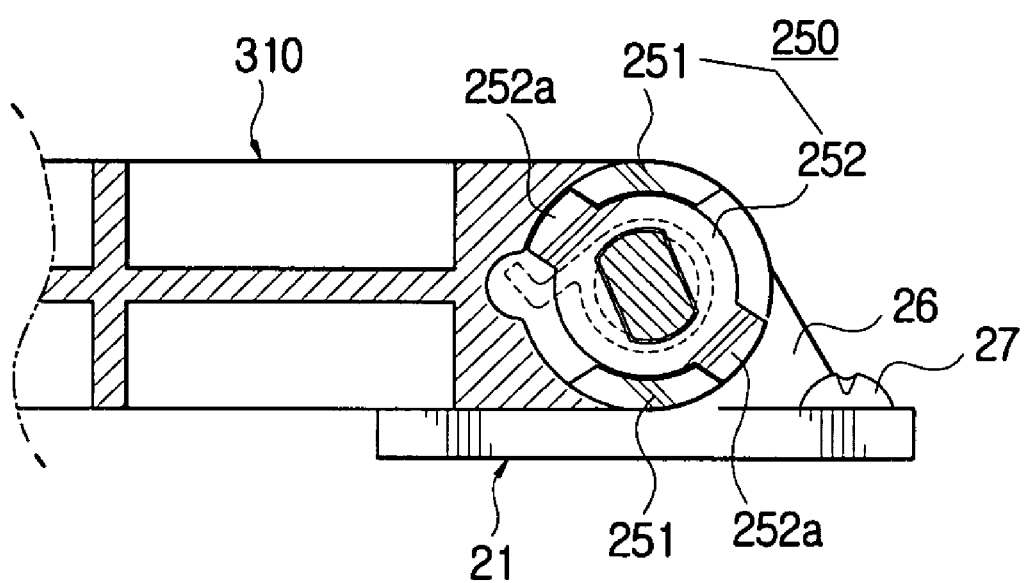

In the state of the monitor illustrated in FIG. 15, if the link member 310 is more downwardly pressed along the arrow "D", the link member 310 is slowly rotated because of the elasticity of the first torsion spring 235 until one of the first stoppers 251 provided at the second base hinge part 240 is engaged with the projections 252a of the first rotation-restricting washer 252 (see FIG. 18C). Here, the link member 310 is not downwardly rotated anymore, as is illustrated in FIG. 16. At this time, the second link supporting part 293 is rotated in a clockwise direction "E" beyond the state as shown in FIG. 15.

In the state of the monitor illustrated in FIG. 16, to fold the main body 22 on the base member 21, the projection 262a passes the first end 263a of the third stopper 263 while the third stopper 263 is rotated on the bolt 267 by pushing the second end 263b thereof. As shown in FIG. 19C, the third stopper 263 moves from the solid line to the dotted line.

Figure 17:
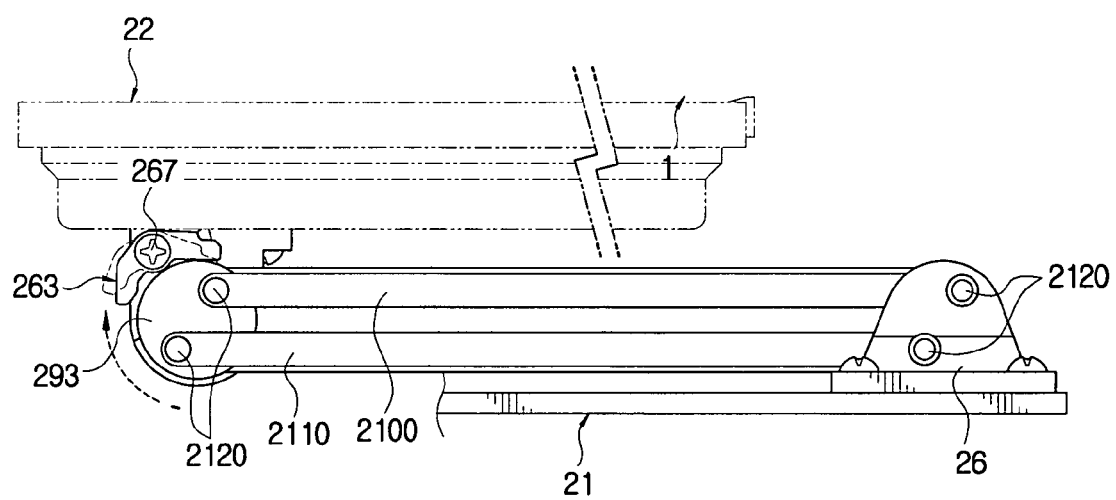

The upper part of the main body 22 is downwardly pressed toward the base member 21, and then the main body 22 is rotated on the third and fourth hinge pins 283 and 294, respectively, so that the main body 22 is, as shown in FIG. 17, laid on the base member 21. Here, the projection 262a of the second rotation-restricting washer 262 passes the first end 263a of the third stopper 263 and then moves as far as the second stopper 261 (see FIG. 19D).

A process of altering the monitor from the state as shown in FIG. 17 (together with FIGS. 18C and 19D) into the state as shown in FIG. 14 is performed in reverse to the order described above.

Figure 20:
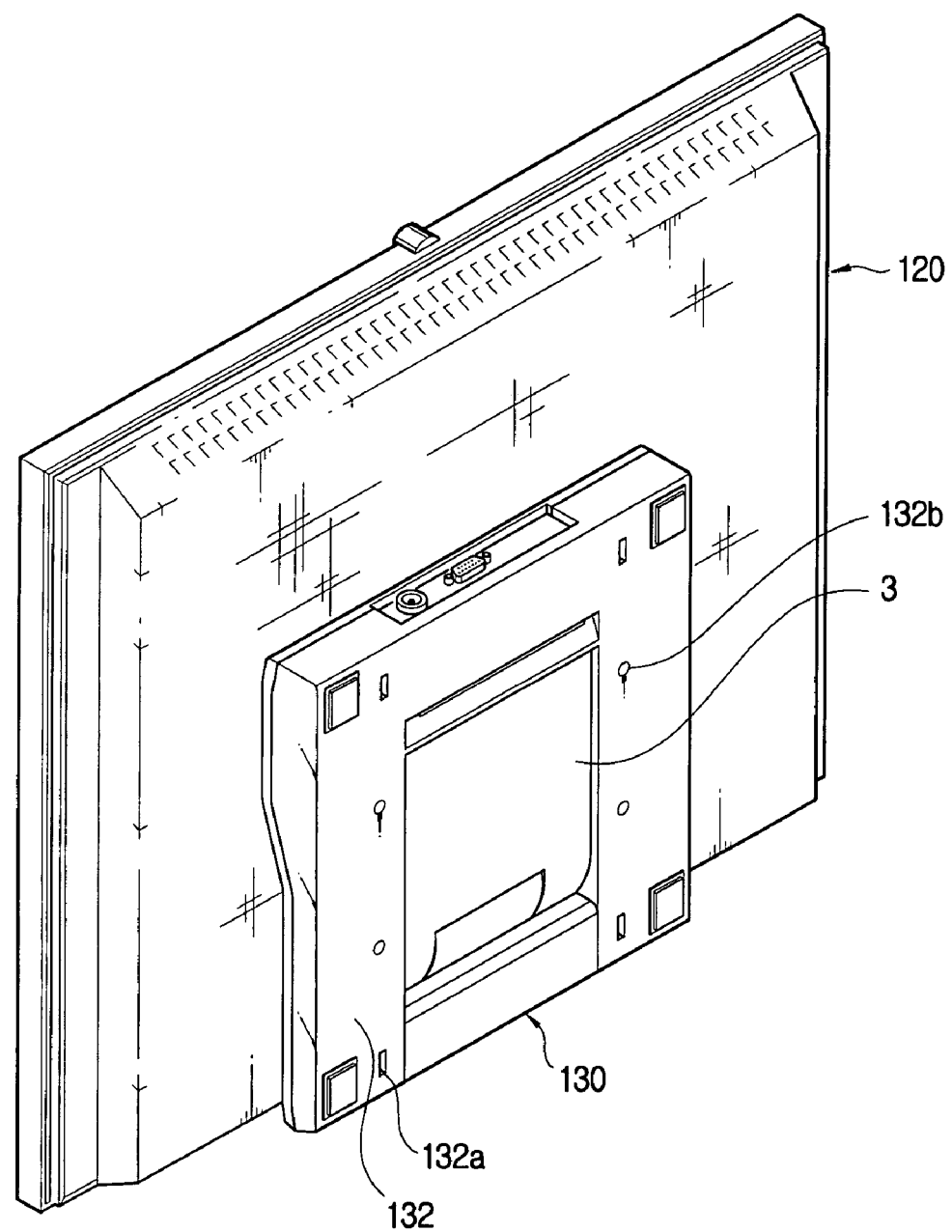
FIG. 20 is a perspective view illustrating a rear of a base member of the monitor, according to another embodiment of the present invention.

FIG. 20 is a perspective view illustrating a rear of a base member of the monitor, according to another embodiment of the present invention. As shown in FIG. 20, the base member 130 includes a plurality of combining holes 132b formed according to (VESA). The combining holes 132b are formed to correspond to the plurality of second combining holes 145 of the base bracket 140 so as to combine with an arm stand 170.

As described above, because the main body 22 is completely laid on the base member 21, the packing volume of the monitor is decreased, thereby decreasing the cost of packing the monitor and a space to keep and carry the monitor.

In the above description, the first torsion spring 235 and the rotation-angle restricting device 250 are provided at the first and second base hinge parts 230 and 240, respectively. However, positions thereof may be exchanged.

Further, the monitor angle restricting device 260 restricting the angle adjustment of the monitor main body 22 may be provided at the first monitor hinge part 280.

As described above, the present invention provides a monitor, in which a base member is installed onto an inclined plane such as a wall, an arm stand, etc., and more particularly, a monitor which is easily installed onto various arm stands according to VESA.

Further, the present invention provides a monitor which properly adjusts a tilting angle of a main body against a base member, and decreases costs to keep and carry the monitor by decreasing the packing volume thereof.

Although a few embodiments of the present invention have been shown and described, it would be appreciated by those skilled in the art that changes may be made in these embodiments without departing from the principles and spirit of the invention, the scope of which is defined in the appended claims and their equivalents.

What is claimed is:

1. A monitor having a monitor main body and a base member to support the monitor main body, comprising:
   a link member disposed between the monitor main body and the base member;
   a base hinge pivotally coupling the link member with the base member, the base hinge allowing the link member to rotate about a first axis;
   a monitor hinge pivotally coupling the monitor main body with the link member, the monitor hinge allowing the monitor main body to rotate about a second axis; and
   an auxiliary link member coupling the base hinge with the monitor hinge to transfer at least a portion of a rotational movement of the link member about the first axis to the monitor hinge such that the monitor main body rotates about the second axis in an amount proportional to the rotational movement of the link member about the first axis, allowing the link member to be folded to an inside portion of the base member.

2. The monitor according to claim 1, further comprising:
   at least one fixing bracket fixedly attached to the base member, wherein the base hinge includes at least one base hinge part to pivotally couple the link member with the fixing bracket.

3. The monitor according to claim 2, wherein:
   the base hinge part comprises a hinge pin.

4. The monitor according to claim 2, further comprising:
   a spring disposed between the fixing bracket and the link member, the spring elastically resisting a downward tilting of the link member about the first axis.

5. The monitor according to claim 2, wherein the base hinge part comprises:
   a tilt restricting mechanism to restrict the rotational movement of the link member about the first axis to a predetermined amount.

6. The monitor according to claim 1, wherein the monitor hinge comprises:
   a support block fixed to the monitor main body, the support block being pivotally coupled to the link member.

7. The monitor according to claim 6, wherein
the monitor hinge includes a first monitor hinge part and a second monitor hinge part coupled to a first and second opposing ends of the support block, respectively, at least one of the first and second monitor hinge parts comprising a hinge pin to pivotally connect the support block with the link member.

8. The monitor according to claim 6, wherein
the monitor hinge comprises a monitor angle restricting mechanism that provides a force barrier to obstruct the monitor main body from rotating about the second axis beyond a predetermined amount.

9. The monitor according to claim 8, wherein
the monitor angle restricting mechanism, when a sufficient force is applied to overcome said force barrier, allows the monitor main body to rotate beyond said predetermined amount into a folded position, in which the monitor main body is folded substantially parallel with the link member.

10. The monitor according to claim 9, wherein the monitor angle restricting mechanism comprises:
a rotation-restricting washer fixed to the link member, the rotation-restricting washer having a projection;
a stopper disposed on the support block; and
a spring fixed to the support block, the flat spring providing a resistive bias against a movement of the stopper, said spring, when the force barrier is overcome, being deformed to allow said stopper to move out of the way of the projection of the rotation-restricting washer, allowing the projection to move past the stopper.

11. The monitor according to claim 8, wherein:
the predetermined amount of the rotational movement of the monitor main body ranges from −5° to 30°.

12. The monitor according to claim 1, wherein:
the auxiliary link member comprises at least one elongated member extending parallel along the length of the link member.

13. The monitor according to claim 1, wherein:
the auxiliary link member comprises a pair of elongated members each extending lengthwise parallel along one side of the link member.

14. The monitor according to claim 1, wherein:
the base member is provided with at least one cable port for receiving at least one of an electrical power and a display related signal.

15. The monitor according to claim 14, wherein:
the link member comprises a cable accommodating part to accommodate a cable connected between the cable port and a circuitry housed within the monitor main body; and
wherein the monitor hinge comprises a cable accommodating groove to accommodate the cable.

16. The monitor according to claim 1, wherein the base member is provided with a link accommodating part, within which to accommodate at least a portion of the link member.

17. The monitor according to claim 1, further comprising:
a detachable wall-mount bracket configured to be detachably attached to the base member, the detachable wall-mount bracket having a plurality of mounting holes, through which the detachable wall-mount bracket is installed on an inclined plane.

18. The monitor according to claim 17, wherein:
locations of, and distances between, each of the plurality of mounting holes are in accordance with the VESA (Video Electronic Standard Association) standard.

19. A monitor having a monitor main body and a base member to support the monitor main body, comprising:
a link member provided between the monitor main body and the base member;
a base hinge to allow the link member to rotate about a first axis;
a monitor hinge to allow the monitor main body to rotate about a second axis; and
an auxiliary link member allowing the monitor main body to rotate about the second axis when the link member and the auxiliary link member rotate about the first axis,
wherein the monitor main body and the link member are folded with the base member by the monitor hinge and the base hinge,
wherein the base member is provided with at least one cable port for receiving at least one of an electrical power and a display related signal, and
wherein the monitor hinge comprises a cable accommodating groove to accommodate the cable.

20. A monitor having a monitor main body and a base member to support the monitor main body, comprising:
a link member disposed between the monitor main body and the base member;
a base hinge pivotally coupling the link member with the base member, the base hinge allowing the link member to rotate about a first axis;
a monitor hinge pivotally coupling the monitor main body with the link member, the monitor hinge allowing the monitor main body to rotate about a second axis; and
an auxiliary link member coupling the base hinge with the monitor hinge to transfer at least a portion of a rotational movement of the link member about the first axis to the monitor hinge such that the monitor main body rotates about the second axis in an amount proportional to the rotational movement of the link member about the first axis,
wherein at least one of the base hinge and the monitor hinge uses friction to prevent the monitor main body from being downwardly rotated about at least one of the first axis and the second axis,
wherein the base member is provided with at least one cable port for receiving at least one of an electrical power and a display related signal, and
wherein the monitor hinge comprises a cable accommodating groove to accommodate the cable.

21. The monitor according to claim 20, wherein at least one of the base hinge and the monitor hinge comprises:
a pin; and
a pin accommodating part to accommodate the pin,
wherein the pin and the pin accommodating part have a predetermined friction therebetween.

22. A monitor supporting apparatus having a monitor main body, the monitor supporting apparatus comprising:
a base member to support the monitor main body;
a link member provided between the monitor main body and the base member;
a base hinge to allow the link member to rotate about a first axis;
a monitor hinge to allow the monitor main body to rotate about a second axis; and
an auxiliary link member allowing the monitor main body to rotate about the second axis when the link member and the auxiliary link member rotate about the first axis,
wherein the monitor main body and the link member are folded with the base member by the monitor hinge and the base hinge, wherein the base member is provided with at least one cable port for receiving at least one of an electrical power and a display related signal, and wherein the monitor hinge comprises a cable accommodating groove to accommodate the cable.

23. A monitor supporting apparatus having a monitor main body, the monitor supporting apparatus comprising:

a base member to support the monitor main body;

a link member coupled to the monitor main body and the base member;

a base hinge to allow the link member to rotate about a first axis;

a monitor hinge to allow the monitor main body to rotate about a second axis; and an auxiliary link member allowing the monitor main body to rotate about the second axis when the link member and the auxiliary link member rotate about the first axis, wherein at least one of the base hinge and the monitor hinge uses friction to prevent the monitor main body from being downwardly rotated about at least one of the first axis and the second axis, wherein the base member is provided with at least one cable port for receiving at least one of an electrical power and a display related signal, and wherein the monitor hinge comprises a cable accommodating groove to accommodate the cable.

24. The monitor supporting apparatus according to claim 23, wherein at least one of the base hinge and the monitor hinge comprises:

a pin; and a pin accommodating part to accommodate the pin, wherein the pin and the pin accommodating part have a predetermined friction therebetween.

25. The supporting apparatus according to claim 23, wherein the monitor main body and the link member are folded with the base member by the monitor hinge and the base hinge.

26. The monitor supporting apparatus according to claim 23, further comprising:

at least one fixing bracket fixedly attached to the base member, wherein the base hinge includes at least one base hinge part to pivotally couple the link member with the fixing bracket, and wherein the base hinge part comprises a hinge pin.

27. The monitor supporting apparatus according to claim 26, further comprising:

a spring disposed between the fixing bracket and the link member, the spring elastically resisting a downward tilting of the link member about the first axis.

28. The monitor supporting apparatus according to claim 26, wherein the base hinge part comprises:

a tilt restricting mechanism to restrict the rotational movement of the link member about the first axis to a predetermined amount.

29. The monitor supporting apparatus according to claim 23, wherein the monitor hinge comprises:

a support block fixed to the monitor main body, the support block being pivotally coupled to the link member.

30. The monitor supporting apparatus according to claim 29, wherein:

the monitor hinge includes a first monitor hinge part and a second monitor hinge part coupled to a first and second opposing ends of the support block, respectively, at least one of the first and second monitor hinge parts comprising a hinge pin to pivotally connect the support block with the link member.

31. The monitor supporting apparatus according to claim 29, wherein:

the monitor hinge comprises a monitor angle restricting mechanism that provides a force barrier to obstruct the monitor main body from rotating about the second axis beyond a predetermined amount.

32. The monitor supporting apparatus according to claim 31, wherein:

the monitor angle restricting mechanism, when a sufficient force is applied to overcome said force barrier, allows the monitor main body to rotate beyond said predetermined amount into a folded position, in which the monitor main body is folded substantially parallel with the link member.

33. A monitor supporting apparatus according to claim 32, wherein the monitor angle restricting mechanism comprises:

a rotation-restricting washer fixed to the link member, the rotation-restricting washer having a projection;

a stopper disposed on the support block; and a spring fixed to the support block, the flat spring providing a resistive bias against a movement of the stopper, said spring, when the force barrier is overcome, being deformed to allow said stopper to move out of the way of the projection of the rotation-restricting washer, allowing the projection to move past the stopper.

34. The monitor supporting apparatus according to claim 31, wherein:

the predetermined amount of the rotational movement of the monitor main body ranges from −5° to 30°.

35. The monitor supporting apparatus according to claim 23, wherein:

the auxiliary link member comprises at least one elongated member extending parallel along the length of the link member.

36. The monitor supporting apparatus according to claim 23, wherein:

the auxiliary link member comprises a pair of elongated members each extending lengthwise parallel along one side of the link member.

37. The monitor supporting apparatus according to claim 23, wherein the base member is provided with a link accommodating part, within which to accommodate at least a portion of the link member.

38. The monitor supporting apparatus according to claim 23, further comprising:

a detachable wall-mount bracket configured to be detachably attached to the base member, the detachable wall-mount bracket having a plurality of mounting holes, through which the detachable wall-mount bracket is installed on an inclined plane.

39. The monitor supporting apparatus according to claim 38, wherein:

locations of, and distances between, each of the plurality of mounting holes are in accordance with the VESA (Video Electronic Standard Association) standard.

40. A monitor having a monitor main body and a base member to support the monitor main body, comprising:

a link member disposed between the monitor main body and the base member;

a first hinge pivotally coupling the link member with the base member, the first hinge allowing the link member to rotate about a first axis;

a second hinge pivotally coupling the monitor main body with the link member, the second hinge allowing the monitor main body to rotate about a second axis; and an auxiliary link member coupling the first hinge to the second hinge to transfer at least a portion of a rotational movement of the link member about the first axis to the second hinge such that the monitor main body automatically rotates about the second axis in an amount proportional to the rotational movement of the link member about the first axis, wherein the monitor main body is also capable of independent rotational movement about the second axis and the rotational movement about the second axis is independent of rotational movement about the first axis, allowing the monitor main body to be folded to the base member.

41. The monitor according to claim 40, wherein: the first hinge is a base hinge and the second hinge is a monitor hinge.

42. The monitor according to claim 41, wherein: the base hinge is connected to the base member and the monitor hinge is connected to the monitor main body.

43. The monitor according to claim 40, wherein: the monitor main body is independently rotated by a manual operation by the user.

44. The monitor according to claim 43, wherein: the monitor main body and the base member can be configured to be substantially parallel to each other upon the manual operation by the user.

45. The monitor according to claim 40, wherein: the link member is formed to be substantially a rectangular shape.

46. The monitor according to claim 40, wherein: the rotation of the link member about the first axis causes the monitor main body to be adjusted in height.

47. The monitor according to claim 46, wherein: the rotation of the monitor main body about the second axis causes the monitor main body to be adjusted in tilt.

48. The monitor according to claim 47, wherein: the first hinge is a base hinge and the second hinge is a monitor hinge.

* * * * *

UNITED STATES PATENT AND TRADEMARK OFFICE
CERTIFICATE OF CORRECTION

PATENT NO. : 7,604,206 B2 Page 1 of 1
APPLICATION NO. : 10/295831
DATED : October 20, 2009
INVENTOR(S) : Hyun-Jun Jung et al.

It is certified that error appears in the above-identified patent and that said Letters Patent is hereby corrected as shown below:

Column 19, Line 1, after "wherein" insert --:--.

Column 19, Line 8, after "wherein" insert --:--.

Column 19, Line 13, after "wherein" insert --:--.

Signed and Sealed this

Twenty-third Day of March, 2010

David J. Kappos
*Director of the United States Patent and Trademark Office*